United States Patent
Parra-Almanza

(10) Patent No.: US 12,133,524 B1
(45) Date of Patent: Nov. 5, 2024

(54) CRYOPRESERVATION DEVICE WITH INTEGRATED TRACKING DEVICE CHAMBER

(71) Applicant: Biotech, Inc., Alpharetta, GA (US)

(72) Inventor: Jorge E. Parra-Almanza, Alpharetta, GA (US)

(73) Assignee: Biotech, Inc., Alpharetta, GA (US)

( * ) Notice: Subject to any disclaimer, the term of this patent is extended or adjusted under 35 U.S.C. 154(b) by 0 days.

(21) Appl. No.: 18/584,399

(22) Filed: Feb. 22, 2024

Related U.S. Application Data

(63) Continuation of application No. 18/136,419, filed on Apr. 19, 2023, now Pat. No. 11,937,597.

(51) Int. Cl.
*A01N 1/02* (2006.01)
*G06K 19/07* (2006.01)

(52) U.S. Cl.
CPC ....... *A01N 1/0263* (2013.01); *G06K 19/0723* (2013.01)

(58) Field of Classification Search
CPC ............... A01N 1/0263; A01N 1/0268; G06K 19/0723; G01N 33/5005; B01L 7/50; B01L 7/52; B01L 2200/027; B01L 2300/044; B01L 2300/047; B01L 2300/0672; B01L 2300/0816; B01L 2300/0887; B01L 2400/0406; B01L 2400/0481; B01L 2400/0677; B01L 2400/0694; B01L 2400/086
See application file for complete search history.

(56) References Cited

U.S. PATENT DOCUMENTS

| | | | |
|---|---|---|---|
| 9,589,225 B2 | 3/2017 | Morris | |
| 9,697,457 B2 | 7/2017 | Morris | |
| 10,748,050 B2 | 8/2020 | Morris et al. | |
| 10,973,226 B2 | 4/2021 | Blair et al. | |
| 11,252,956 B2 | 2/2022 | Blair et al. | |
| 11,446,669 B2 | 9/2022 | Fiondella et al. | |
| 11,937,597 B1 * | 3/2024 | Parra-Almanza | A01N 1/0268 |
| 2008/0038155 A1 * | 2/2008 | Chian | A61D 19/024 |
| | | | 435/307.1 |
| 2016/0174545 A1 | 6/2016 | Parra et al. | |
| 2022/0184625 A1 | 6/2022 | Bixon et al. | |
| 2022/0361483 A1 * | 11/2022 | Matsuzawa | A01N 1/0221 |
| 2022/0388005 A1 * | 12/2022 | Murray | A01N 1/0268 |

* cited by examiner

*Primary Examiner* — Michael L Hobbs
(74) *Attorney, Agent, or Firm* — Clements Bernard Walker; Richard A. Walker; Jennifer R. Knight

(57) ABSTRACT

The present invention provides a cryopreservation device with an integrated tracking device chamber. The tracking device can be an RFID tag which can be placed in the cryopreservation device as part of the procedure for vitrification of a biological specimen. The cryopreservation device maintains its integrity and keeps the RFID tag securely in the chamber at both ambient conditions when the specimen is collected and under liquid nitrogen where the specimen is stored. The cryopreservation device with an integrated tracking device chamber allows for each individual biological sample to have its own tracking device for monitoring during cryogenic storage.

19 Claims, 15 Drawing Sheets

CRYOPRESERVATION DEVICE WITH INTEGRATED TRACKING DEVICE CHAMBER

CROSS-REFERENCE

This application claims priority to U.S. Non-Provisional application Ser. No. 18/136,419 filed on Apr. 19, 2023, which granted as U.S. Pat. No. 11,937,597 on Mar. 26, 2024, and which is incorporated herein by reference in its entirety.

FIELD OF THE INVENTION

The present invention relates generally to the field of devices for the cryopreservation of biological specimens. More specifically, it relates to devices capable of being remotely identified through RFID technology.

BACKGROUND OF THE INVENTION

Cryopreservation is practiced in the life sciences for the purpose of halting biological activity in viable cells for an extended period of time. Among the techniques used for cryopreservation is vitrification.

Vitrification involves the transformation of a solution comprised of a biological specimen, i.e., an oocyte or an embryo, into a glass-like amorphous solid that is free from any crystalline structure, followed by extremely rapid cooling. One of the major challenges of this method is to prevent the intracellular liquid within the oocyte or embryo to form ice crystals. Accordingly, the first step is to dehydrate the cell or cells as much as possible using cryoprotectant containing fluids called "vitrification media." The biological specimen is then rapidly chilled by immersion in a cryogenic fluid such as liquid nitrogen ($LN_2$). With a proper combination of chilling speed and cryoprotectant concentration, intracellular water will attain a solid, innocuous, glassy (vitreous) state rather than an orderly, damaging, crystalline ice state. Vitrification can be described as a rapid increase in fluid viscosity that traps the water molecules in a random orientation. Vitrification media, however, can contain relatively high levels of cryoprotectant that can be toxic to cells except in the vitreous state. As a result, the time exposure of cells to vitrification media during dehydration and warming must be carefully controlled to avoid cellular injury, and, accordingly, it is desirable to chill the specimen as quickly as possible.

The CRYOLOCK cryopreservation device was developed as a versatile, simple, and efficient vitrification device that is intended for holding, cryopreservation, and storage of oocytes or embryos in liquid nitrogen. It is a cryopreservation device which allows the specimen to be rapidly cooled and stored without direct contact with the aseptic liquid nitrogen ($LN_2$). The CRYOLOCK cryopreservation device is described in U.S. Patent Application Publication number US 2016/0174545, published on Jun. 23, 2016, which is incorporated herein by reference in its entirety.

The CRYOLOCK cryopreservation device uses the combination of semi-flexible plastic and a functional design, including specific shapes and close clearances, to hermetically seal a specimen within the cryopreservation device at room temperature and maintain the hermetic seal as the cryopreservation device and specimen cool to the temperature of the liquid nitrogen.

Due to the expense of storing specimens in liquid nitrogen, multiple samples are stored in a given cryostorage tank. As entire cryopreservation devices are stored in the cryostorage tank, the size of each cryopreservation device and the packing characteristics of such cryopreservation devices impact the amount to space required, and thus, the cost of storage. On top of the simple space concern, there is a need for ongoing quality management and audits to ensure tracking of the identity and storage conditions of each sample over time. If cryopreservation devices need to be removed from the cryostorage device during a quality audit, the temperature swings can impact the long-term viability of the specimen.

There is a need to be able to identify each sample/device in a cryostorage tank without removing the cryopreservation device from the cryostorage tank. There is a need to maintain or reduce the size of cryopreservation devices that are able to self-identify, particularly at the single biological specimen level. There is a need to maintain the ability to identify each specimen/device over the life cycle of the gathering, storage, retrieval, and use of each specimen.

Incorporating an RFID tag in each cryopreservation device presents several challenges. First, the part of the device that holds the biological specimen must be sterilized, and it typically is sterilized with gamma radiation which can damage the RFID tag's ability to function. Also, the incorporation of the RFID tag must fit into the flow of work during vitrification process, which means the RFID tag needs to be securely engaged with a part of the cryopreservation device before the biological specimen is collected as the time between collecting the specimen and immersion in liquid nitrogen is necessarily short. The RFID tag needs to be securely held by the cryopreservation device at ambient conditions and at the temperature of liquid nitrogen, without causing damage to the cryopreservation device upon such large temperature swings. There is a need to minimize any size increase in the cryopreservation device capable of holding an RFID tag. Ideally, the RFID tag can be secured to the cryopreservation device without the need for an adhesive which may be impacted by the low temperatures.

BRIEF SUMMARY OF THE INVENTION

According to an embodiment of the present invention, a cryopreservation device capable of holding a Radio Frequency Identification (RFID) tag is provided. The cryopreservation device comprises a) an elongated stick comprising an RFID section, an elongated body, and a specimen collection tip, and b) a cap comprising a hollow chamber, wherein the hollow chamber has a length sufficient to accommodate the specimen collection tip. The cap is capable of enclosing the specimen collection tip within the hollow chamber when the cap is removably attached to the elongated stick. The RFID section is distal to the specimen collection tip, and the RFID section is capable of holding an RFID tag.

According to another embodiment of the present invention, a cryopreservation device capable of holding an RFID tag is provided. The cryopreservation device comprises a) an elongated stick comprising an RFID section, an elongated body, a frustoconical boss extending from a first end of the elongated body, and a specimen collection tip extending from the frustoconical boss, and b) a cap comprising a hollow chamber, wherein the hollow chamber has a length sufficient to accommodate the specimen collection tip and the frustoconical boss. The cap is capable of enclosing the specimen collection tip and the frustoconical boss within the hollow chamber when the cap is removably attached to the elongated stick. The RFID section is distal to the specimen collection tip, and the RFID section is capable of holding an RFID tag. The RFID section comprises a) an RFID chamber capable of holding the RFID tag, b) an RFID opening through which the RFID tag can be placed into the RFID chamber, and c) a locking mechanism abutting a circumference of the RFID opening.

According to yet another embodiment of the present invention, a cryopreservation device capable of holding an RFID tag is provided. The cryopreservation device comprises a) an elongated stick comprising an RFID section, an elongated body, a frustoconical boss extending from a first end of the elongated body, and a specimen collection tip extending from the frustoconical boss, and b) a cap comprising a hollow chamber, wherein the hollow chamber has a length sufficient to accommodate the specimen collection tip and the frustoconical boss. The cap is capable of enclosing the specimen collection tip within the hollow chamber when the cap is removably attached to the elongated stick. The RFID section is distal to the specimen collection tip, and the RFID section is capable of holding an RFID tag. The RFID section comprises a) an RFID chamber capable of holding the RFID tag, b) an RFID opening through which the RFID tag can be placed into the RFID chamber, and c) a locking mechanism abutting a circumference of the RFID opening. The elongated stick is made of one integrated piece of plastic. The RFID opening is at the end of the elongated stick. The RFID chamber comprises a cylindrical chamber outlined by plastic in a prism shape and the RFID tag is cylindrical. The prism shape has a first longitudinal slit and a second longitudinal slit, each slit starting at the RFID opening. The first longitudinal slit is 50% to 95% a length of the RFID chamber and the second longitudinal slit is 20% to 60% of the length of the RFID chamber. The first longitudinal slit is across the RFID chamber from the second longitudinal slit. The locking mechanism comprises a ledge at least partially around the inside of the RFID opening.

According to yet another embodiment of the present invention, a process for vitrifying a biological specimen is provided. The process comprises the steps of a) obtaining a cryopreservation device of any of the above embodiments, b) obtaining a liquid nitrogen resistant RFID tag, c) placing the RFID tag into the RFID chamber, reading the RFID tag and associating the RFID tag with the biological specimen, e) adding a vitrification mixture to dehydrate the biological specimen, f) collecting the dehydrated biological specimen on the elongated stick, g) enclosing the dehydrated biological specimen with a cap secured to the elongated stick, and h) placing the cryopreservation device into liquid nitrogen.

BRIEF DESCRIPTION OF THE DRAWINGS

The present invention is illustrated and described herein with reference to the various drawings, in which like reference numbers denote like method steps and/or system components, respectively, and in which:

FIG. 2c is a side view of the opposite side, (rotated 180 degrees along the longitudinal axis) of the embodiment shown in FIG. 2a;

FIG. 2d is an isometric view of the RFID section of the embodiment shown in FIG. 2a;

FIG. 3a is a side view of the exemplary embodiment of the cryopreservation device of Example 2;

FIG. 3b is a top view of the RFID section and the end of the elongated stick of embodiment shown in FIG. 3a;

FIG. 3c is an isometric view of the RFID section and the end of the elongated stick of the embodiment shown FIG. 3a;

FIG. 4b is a section view of the cryopreservation device shown in FIG. 4a;

FIG. 4c is a detailed section view of the RFID section of the cryopreservation device shown in FIG. 4a;

FIG. 5b is a section view of the embodiment shown in FIG. 5a;

FIG. 5c is a detailed section view of the RFID section of the embodiment shown in FIG. 5a;

FIG. 9b is a section view of the RFID section of the embodiment shown in FIG. 9a;

FIG. 9c is a detailed top view of the RFID section of the embodiment shown in FIG. 9a.

DETAILED DESCRIPTION OF THE INVENTION

Figure 1A:
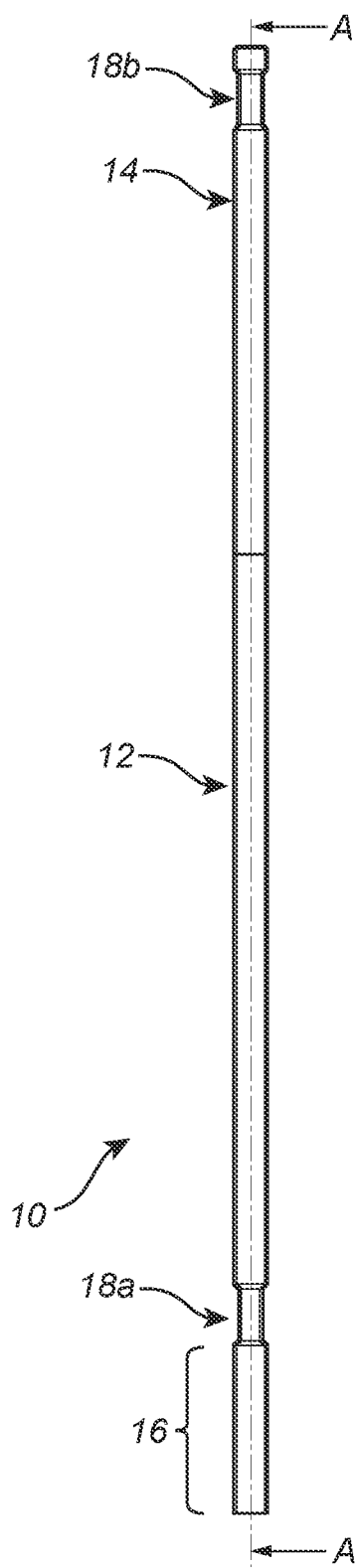
FIG. 1a is a side view of the cryopreservation device of Comparative Example 1.
Figure 1B:
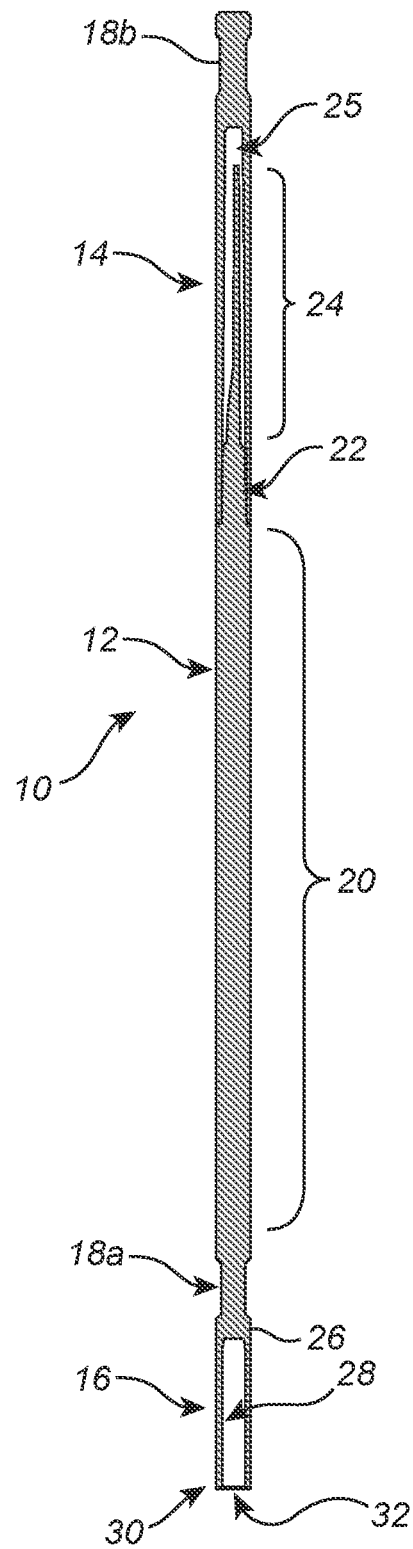
FIG. 1b is a section view of the cryopreservation device of FIG. 1a along line A-A.

An embodiment of the present invention provides a cryopreservation device capable of holding a Radio Frequency Identification (RFID) tag. The cryopreservation device comprises a) an elongated stick comprising an RFID section, an elongated body, and a specimen collection tip, and b) a cap comprising a hollow chamber, wherein the hollow chamber has a length sufficient to accommodate the specimen collection tip. The cap is capable of enclosing the specimen collection tip within the hollow chamber when the cap is removably attached to the elongated stick. The RFID section is distal to the specimen collection tip and the RFID section is capable of holding an RFID tag.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

It is to be understood that the mention of one or more method steps does not preclude the presence of additional method steps before or after the combined recited steps or intervening method steps between those steps expressly identified. Moreover, the lettering of method steps or ingredients is a conventional means for identifying discrete activities or ingredients and the recited lettering can be arranged in any sequence, unless otherwise indicated. Method steps that begin with the word "optionally" may occur, but they are not required to occur.

As used herein, the term "and/or", when used in a list of two or more items, means that any one of the listed items can be employed by itself, or any combination or two or more of the listed items can be employed. For example, if a composition is described as containing compounds A, B, "and/or" C, the composition may contain A alone; B alone; C alone; A and B in combination; A and C in combination; B and C in combination; or A, B, and C in combination.

The RFID tag is not particularly limited as long as the RFID tag is compatible with liquid nitrogen. To be compatible with liquid nitrogen, the RFID tag works as intended both at ambient conditions and when submerged in, and thus at the temperature of, liquid nitrogen. An RFID tag works as intended when it can receive an interrogation from an RFID reader and send back the RFID tag's unique identification to the reader. In some aspects, the RFID tag is one item containing an integrated circuit, an antenna, and a substrate. In some aspects, the substrate comprises silicon, and/or carbon fiber.

In some aspects, the cryopreservation device further comprises an a frustoconical boss extending from a first end of the elongated body. In some aspects, the specimen collection tip extends from the frustoconical boss. In some aspects, the cap is capable of enclosing the specimen collection tip within the hollow chamber when the cap is removably attached to the elongated stick. In some aspects, the cap is capable of hermetically enclosing the specimen collection tip within the hollow chamber when the cap is removably attached to the elongated stick.

In some aspects, the RFID section comprises a) an RFID chamber capable of holding the RFID tag, b) an RFID opening through which the RFID tag can be placed into the RFID chamber, and c) a locking mechanism abutting a circumference of the RFID opening.

In some aspects, the elongated stick is made of one integrated piece of plastic. For example, the elongated stick is made from one integrated piece of plastic when it is injection molded in a mold that forms the RFID section, the elongated body, the specimen collection tip, and any other components of the elongated stick. In another example, the elongated stick is made from one integrated piece of plastic when it is 3D printed.

In some aspects, when the RFID tag is placed in the RFID chamber and the cryopreservation device is placed in liquid nitrogen for 5 minutes, the RFID tag remains in the RFID chamber and the cryopreservation device shows no visible cracks. In some aspects, when the RFID tag is placed in the RFID chamber and the cryopreservation device is placed in liquid nitrogen for 5 minutes, the RFID tag remains in the RFID chamber and the cryopreservation device shows no cracks with 10× magnification.

In some aspects, the shape of the RFID chamber corresponds to the shape of the RFID tag. In some aspects, the shape of the RFID tag is a cube, a cuboid, a cone, a cylinder, a sphere, a pyramid, or a prism. In some aspects, the shape of the RFID tag is a cylinder. In some aspects, the RFID tag as a length ranging 4 mm to 12 mm long. In some aspects, the RFID has a diameter ranging from 0.5 mm to 4 mm, 0.5 to 3.5, or 0.5 to 3 mm, or 0.5 to 2.5 mm, or 0.05 mm to 2.2 mm, or 0.5 mm to 2 mm, or 0.5 mm to 1.8 mm, or 0.5 mm to 1.4 mm, or 0.5 mm to 1.

Having extra volume, width, and/or length of the RFID chamber relative to the RFID tag may allow the RFID chamber walls to contract when immersed in liquid nitrogen while ensuring that a more rigid RFID tag does not crack the walls of the RFID chamber. In some aspects, the volume of the RFID chamber is 1.01 times the volume of the RFID tag. Other non-limiting examples include the volume of the RFID chamber is at least 1.02, or 1.03, or 1.04, or 1.05, or 1.1 times the volume of the RFID tag. In some aspects, the width of the RFID chamber perpendicular to the longitudinal direction of the elongated stick is at least 1.01 or 1.02, or 1.03, or 1.04, or 1.05, or 1.1 the corresponding width of the RFID tag. In some aspects, the length of the RFID chamber along the longitudinal direction of the elongated stick is at least 1.01 or 1.02, or 1.03, or 1.04, or 1.05, or 1.1 the length of the RFID tag.

In some aspects, the RFID opening is located at the end of the elongated stick. In some aspects, the RFID chamber comprises a substantially cylindrical chamber outlined by plastic in a prism shape. In some aspects, the prism shape is cuboidal. In some aspects, the prism shape is hexagonal. In some aspects, the RFID tag is substantially cylindrical, and the prism shape has a first longitudinal slit and a second longitudinal slit, each slit starting at the RFID opening. In some aspects, the first longitudinal slit is 50% to 95% a length of the RFID chamber and the second longitudinal slit is 20% to 60% of the length of the RFID chamber. In some aspects, the first longitudinal slit is longer than the second longitudinal slit. In some aspects, the first longitudinal slit is across the RFID chamber from the second longitudinal slit.

In some aspects, the RFID section dimension in each of the x and y directions, perpendicular to the longitudinal direction, is no larger than about 5 mm. In other examples the RFID section dimension in each of the x and y directions, perpendicular to the longitudinal direction, is no larger than about 4.5 mm, or 4.0 mm, or 3.5, mm, or 3.1 mm, or 3.0 mm, or 2.8 mm, or 2.6 mm, or 2.4 mm.

In some aspects, the RFID opening is located along the longitudinal direction of the elongated stick. The RFID section comprises a locking mechanism abutting a circumference of the RFID opening. In some aspects, the locking mechanism comprises a ledge at least partially around the circumference the RFID opening. In some aspects, the length of the RFID opening is smaller than the length of the RFID tag, and the locking mechanism comprises the part of the RFID section abutting the circumference of the RFID opening and covering the RFID chamber. In some aspects, the RFID tag can be loaded into the RFID chamber at an angle to allow part of the RFID tag to enter the part of the RFID chamber that is beyond the RFID opening and then pushing the rest of the RFID tag through the RFID opening.

In some aspects, a length of the RFID opening is along a longitudinal axis of the elongated stick, wherein the RFID-opening length is shorter than a RFID-chamber length. In some aspects the locking mechanism comprises a circumferential flap bending inward toward the RFID chamber. In some aspects, the locking mechanism further comprises an obtrusion connected to the circumferential flap and protruding over RFID opening. In some aspects, the RFID chamber has at least one dimension perpendicular to the longitudinal direction that is between 1.01% to 1.1% the same dimension of the RFID tag.

Another embodiment of the present invention provides a cryopreservation device capable of holding an RFID tag. The cryopreservation device comprises a) an elongated stick comprising an RFID section, an elongated body, a frustoconical boss extending from a first end of the elongated body, and a specimen collection tip extending from the frustoconical boss, and b) a cap comprising a hollow chamber, wherein the hollow chamber has a length sufficient to accommodate the specimen collection tip and the frustoconical boss. The cap is capable of enclosing the specimen collection tip and the frustoconical boss within the hollow chamber when the cap is removably attached to the elongated stick. The RFID section is distal to the specimen collection tip, and the RFID section is capable of holding an RFID tag. The RFID section comprises a) an RFID chamber capable of holding the RFID tag, b) an RFID opening through which the RFID tag can be placed into the RFID chamber, and c) a locking mechanism abutting a circumference of the RFID opening.

It is to be understood that the various aspects of the elongated stick, the RFID section, the RFID tag, the RFID chamber, the RFID opening, the RFID locking mechanism, the making of the elongated stick, the shapes and sizes of the RFID tag, RFID chamber, and RFID opening, the relative size of aspects of the RFID chamber to the RFID tag, the placement of the RFID opening, any longitudinal slits along the RFID chamber wall, and the RFID section dimension in each of the x and y directions, perpendicular to the longitudinal direction described herein above apply to the present embodiment as well.

In some aspects, the elongated stick is made of one integrated piece of plastic. In some aspects, RFID tag is cylindrical and has a length ranging from 6 mm to 12 mm long and a diameter ranging from 0.5 mm to 4 mm. Other non-limiting examples of the RFID tag diameter are from 0.5 to 3.5, or 0.5 to 3 mm, or 0.5 to 2.5 mm, or 0.05 mm to 2.2 mm, or 0.5 mm to 2 mm, or 0.5 mm to 1.8 mm.

In some aspects, the RFID opening is at the end of the elongated stick. In some aspects, the RFID chamber comprises a substantially cylindrical chamber outlined by plastic in a prism shape. In some aspects, the prism shape is cuboidal. In some aspects, the prism shape is hexagonal. In some aspects, the RFID tag is substantially cylindrical. In some aspects, the prism shape has a first longitudinal slit and a second longitudinal slit, each of the first longitudinal slit and the second longitudinal slit starting at the RFID opening. In some aspects, the locking mechanism comprises a ledge at least partially around the RFID opening.

In some aspects, the first longitudinal slit is 50% to 95% a length of the RFID chamber and the second longitudinal slit is 20% to 60% of the length of the RFID chamber. In some aspects, the first longitudinal slit is longer than the second longitudinal slit. In some aspects, the first longitudinal slit is across the RFID chamber from the second longitudinal slit.

In some aspects, the RFID section dimension in each of the x and y directions, perpendicular to the longitudinal direction, is no larger than about 5 mm. In other examples the RFID section dimension in each of the x and y directions, perpendicular to the longitudinal direction, is no larger than about 4.5 mm, or 4.0 mm, or 3.5, mm, or 3.1 mm, or 3.0 mm, or 2.8 mm, or 2.6 mm, or 2.4 mm.

Yet another embodiment of the present invention provides a cryopreservation device capable of holding an RFID tag. The cryopreservation device comprises a) an elongated stick comprising an RFID section, an elongated body, a frustoconical boss extending from a first end of the elongated body, and a specimen collection tip extending from the frustoconical boss, and b) a cap comprising a hollow chamber, wherein the hollow chamber has a length sufficient to accommodate the specimen collection tip and the frustoconical boss. The cap is capable of enclosing the specimen collection tip and the frustoconical boss within the hollow chamber when the cap is removably attached to the elongated stick. The RFID section is distal to the specimen collection tip, and the RFID section is capable of holding an RFID tag. The RFID section comprises a) an RFID chamber capable of holding the RFID tag, b) an RFID opening through which the RFID tag can be placed into the RFID chamber, and c) a locking mechanism abutting a circumference of the RFID opening. The elongated stick is made of one integrated piece of plastic. The RFID opening is at the end of the elongated stick. The RFID chamber comprises a cylindrical chamber outlined by plastic in a prism shape and the RFID tag is cylindrical. The prism shape has a first longitudinal slit and a second longitudinal slit, each slit starting at the RFID opening. The first longitudinal slit is 50% to 95% a length of the RFID chamber and the second longitudinal slit is 20% to 60% of the length of the RFID chamber. The first longitudinal slit is across the RFID chamber from the second longitudinal slit. The locking mechanism comprises a ledge at least partially around the inside of the RFID opening.

It is to be understood that the various aspects of the elongated stick, the RFID section, the RFID tag, the RFID chamber, the RFID opening, the RFID locking mechanism, the making of the elongated stick, the shapes and sizes of the RFID tag, RFID chamber, and RFID opening, the relative size of aspects of the RFID chamber to the RFID tag, the placement of the RFID opening, any longitudinal slits along the RFID chamber wall, and the RFID section dimension in each of the x and y directions, perpendicular to the longitudinal direction described herein above apply to the present embodiment as well.

According to yet another embodiment of the present invention, a process for vitrifying a biological specimen is provided. The process comprises the steps of a) obtaining a cryopreservation device of any of the above embodiments, b) obtaining a liquid nitrogen resistant RFID tag, c) placing the RFID tag into the RFID chamber, reading the RFID tag and associating the RFID tag with the biological specimen, e) adding a vitrification mixture to dehydrate the biological specimen, f) collecting the dehydrated biological specimen on the elongated stick, enclosing the dehydrated biological specimen with the cap secured to the elongated stick, and h) placing the cryopreservation device into liquid nitrogen.

It is to be understood that the various aspects of the elongated stick, the RFID section, the RFID tag, the RFID chamber, the RFID opening, the RFID locking mechanism, the making of the elongated stick, the shapes and sizes of the RFID tag, RFID chamber, and RFID opening, the relative size of aspects of the RFID chamber to the RFID tag, the placement of the RFID opening, any longitudinal slits along the RFID chamber wall, and the RFID section dimension in each of the x and y directions, perpendicular to the longitudinal direction described herein above apply to the present embodiment as well.

In some aspects, the RFID section shows no visible cracks when placed in liquid nitrogen for 5 minutes.

A non-limiting listing of embodiments follows.

A1. A cryopreservation device comprising
a) an elongated stick comprising an RFID section, an elongated body, and a specimen collection tip, and
b) a cap comprising a hollow chamber, wherein the hollow chamber has a length sufficient to accommodate the specimen collection tip,
wherein the cap is capable of enclosing the specimen collection tip within the hollow chamber when the cap is removably attached to the elongated stick, and
wherein the RFID section is distal to the specimen collection tip, and the RFID section is capable of holding an RFID tag.

A2. The cryopreservation device according to any of embodiment A1, further comprising an a frustoconical boss extending from a first end of the elongated body, wherein the specimen collection tip extends from the frustoconical boss, and wherein the cap is capable of enclosing the specimen collection tip and the frustoconical boss within the hollow chamber when the cap is removably attached to the elongated stick.

A3. The cryopreservation device according to any of embodiments A1 or A2, wherein the RFID section comprises a) an RFID chamber capable of holding the RFID tag, b) an RFID opening through which the RFID tag can be placed into the RFID chamber, and c) a locking mechanism abutting a circumference of the RFID opening.

A4. The cryopreservation device according to any of embodiments A1-A3, wherein the elongated stick is made of one integrated piece of plastic; or wherein the elongated stick is produced by injection molding a polymer resin into a single mold; or wherein the elongated stick is produced by 3D printing.

A5. The cryopreservation device according to any of embodiments A1-A4, when the RFID tag can be placed in the RFID chamber and the cryopreservation device can be placed in liquid nitrogen for 5 minutes, the RFID tag remains in the RFID chamber and the cryopreservation device shows no visible cracks and/or the cryopreservation device shows no cracks when viewed at 10× magnification.

A6. The cryopreservation device according to any of embodiments A1-A5, wherein the RFID tag is cylindrical and has a length ranging from 4 mm to 12 mm long and a diameter ranging from 0.5 mm to 4 mm, 0.5 to 3 mm, or 0.5 to 2.5 mm, or 0.5 mm to 2 mm, or 0.5 mm to 1.8 mm.

A7. The cryopreservation device according to any of embodiments A3-A6, wherein the RFID opening is at the end of the elongated stick, wherein the RFID chamber comprises a substantially cylindrical chamber outlined by plastic in a prism shape, wherein the RFID tag is substantially cylindrical, and wherein the prism shape has a first longitudinal slit and a second longitudinal slit, each slit starting at the RFID opening.

A8. The cryopreservation device according to embodiment A7, wherein the first longitudinal slit is 50% to 95% a length of the RFID chamber and the second longitudinal slit is 20% to 60% a length of the RFID chamber, and wherein the first longitudinal slit is longer than the second longitudinal slit.

A9. The cryopreservation device according to any of embodiments A7 or A8, wherein the first longitudinal slit is across the RFID chamber from the second longitudinal slit.

A10. The cryopreservation device according to any of embodiments A3-A9, wherein the locking mechanism comprises a ledge at least partially around the circumference the RFID opening.

A11. The cryopreservation device according to any of embodiments A1-A10, wherein the RFID section dimension in each of the x and y directions, perpendicular to the longitudinal direction, is no larger than about 5 mm, or 4.5 mm, or 4.0 mm, or 3.5 mm, or 3.1 mm, or 3.0 mm, or 2.8 mm, or 2.6 mm.

A12. The cryopreservation device according to any of embodiments A1-A11, wherein the RFID section dimension in each of the x and y directions, perpendicular to the longitudinal direction, is no larger than about 2.4 mm A13. The cryopreservation device according to any of embodiments A3-A6, wherein a length of the RFID opening is along a longitudinal axis of the elongated stick.

A14. The cryopreservation device according to embodiment A13, wherein the RFID-opening length is shorter than a RFID-chamber length.

A15. The cryopreservation device according to any of embodiments A13 or A14, wherein the locking mechanism comprises a circumferential flap bending inward toward the RFID chamber.

A16. The cryopreservation device according to embodiment A15, wherein the locking mechanism further comprises an obtrusion connected to the circumferential flap and protruding over RFID opening.

A17. The cryopreservation device according to any of embodiments A13-A17, wherein the RFID chamber has a dimension perpendicular to the longitudinal direction that is between 1.01% to 1.1% the same dimension of the RFID tag.

A18. The cryopreservation device according to any of embodiments A13-A17, wherein the RFID section dimension in each of the x and y directions, perpendicular to the longitudinal direction, is no larger than about 3 mm or no larger than about 2.4 mm.

A19. The cryopreservation device according to any of embodiments A1-A18, wherein the RFID tag is liquid nitrogen compatible.

A20. The cryopreservation device according to any of embodiments A1-A19, wherein the cryopreservation device comprises at least one circumferential notch.

A21. The cryopreservation device according to any of embodiments A1-A20, wherein the cap is capable of hermetically enclosing the specimen collection tip within the hollow chamber when the cap is removably attached to the elongated stick.

A22. The cryopreservation device according to any of embodiments A3-A6, A11, A12, or A17-A21, wherein the RFID opening is at the end of the elongated stick and the locking mechanism comprises a plug capable of blocking the RFID opening.

B1. A process for vitrifying a biological specimen, the process comprising:
a) obtaining a cryopreservation device of any of embodiments A1-A20,
b) obtaining an RFID tag;
c) placing the RFID tag into the RFID chamber;
d) reading the RFID tag and associating the RFID tag with the biological specimen;
e) adding a vitrification mixture to dehydrate the biological specimen;
f) collecting the dehydrated biological specimen on the specimen collection tip;
g) enclosing the dehydrated biological specimen by removably attaching the cap to the elongated stick;
h) placing the cryopreservation device into liquid nitrogen.

EXAMPLES

Comparative Example 1, Comparative Example 2, and Example 3 were each performed using a cryopreservation device elongated stick which was injection molded out of polystyrene. Examples 1 and 2 were performed using prototypes of the cryopreservation device elongated stick. The prototypes were 3D printed out of Digital ABS Plus from Statasys, Eden Prairie, MN. The elongated stick of each device/prototype was made of a single integrated piece of plastic. The elongated stick in each example was designed with an RFID chamber to accommodate a transponder RFID microchip tag (RFID tag) which was cylindrical with a 2 mm diameter and 12 mm length available from Shenzhen Manruta Technology Co. Ltd., Guangdong, China. The specimen collection tip of each of the elongated sticks for the Comparative Examples and the Examples was sealable with a CRYOLOCK cap (Biotech, Inc., Alpharetta, GA).

Comparative Example 1

A cryopreservation device as shown in FIGS. 1a-1d was designed and injection molded. Referring to FIGS. 1a, 1b, 1c, and 1d, the cryopreservation device 10 comprised an elongated stick 12 and a cap 14. The elongated stick comprised an RFID section 16, a circumferential notch 18a, an elongated body 20, a frustoconical boss 22 extending from a first end of the elongated body 20, and a specimen collection tip 24 extended from the narrow end of the boss 22. The cap 14 comprised a circumferential notch 18b and an elongated hollow chamber 25 defined along the long axis of the cap 14 and dimensioned to accommodate the specimen collection tip 24 and the frustoconical boss 22. The circumferential notches 18a, 18b disposed near the end of the cap 14 and the distal end of the elongated stick 12 were used to clasp the cryopreservation device 10 with forceps (not shown), making the cryopreservation device 10 easier to manipulate in the varied temperature environments. RFID section 16 comprised an RFID transition zone 26, an RFID chamber 28, and an RFID terminus zone 30. The RFID terminus zone 30 was located along the longitudinal axis further from the elongated body 20 than the RFID transition zone 26, and the RFID chamber 28 was located between the RFID terminus zone 30 and the RFID transition zone 26. The RFID chamber 28 was sized to hold the RFID tag (not shown). As such, RFID chamber 28 was cylindrically shaped and opening 32 was circular.

Figure 1C:
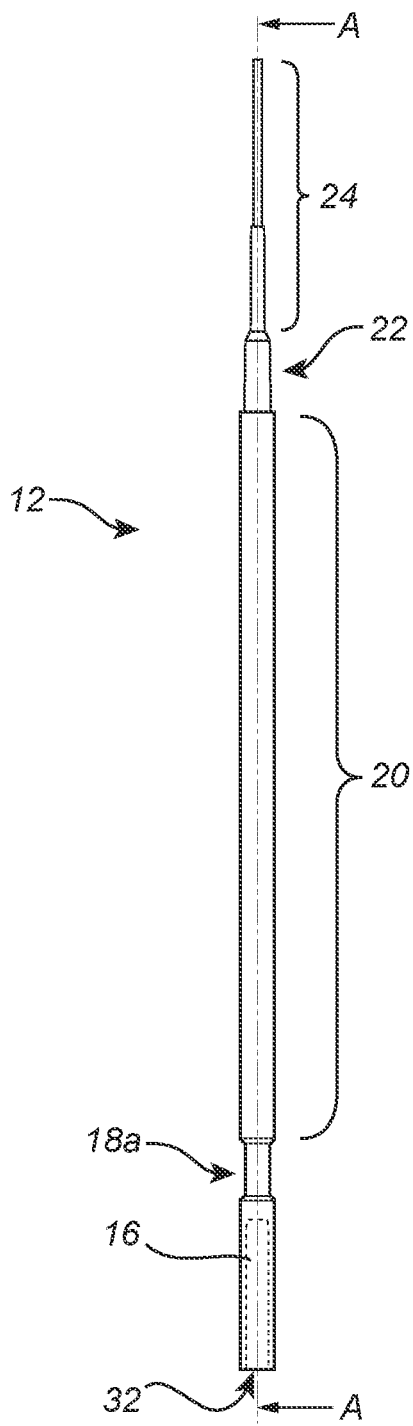
FIG. 1c is a side view of the cryopreservation device of FIG. 1a without a cap.
Figure 1D:
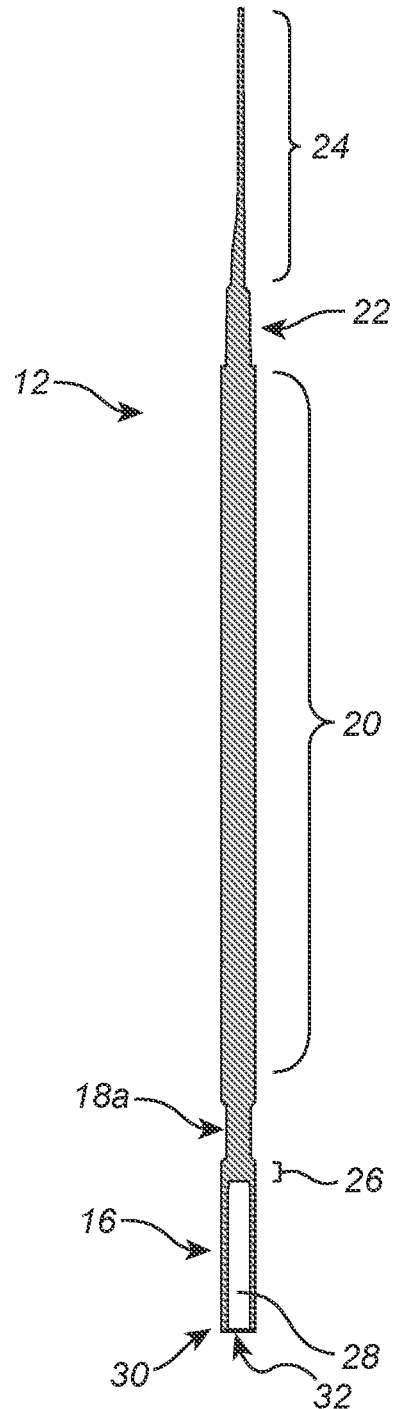
FIG. 1d, is a section view of the cryopreservation device of FIG. 1c along line A-A.

FIGS. 1c and 1d are side and section views of the cryopreservation device 10 shown in FIG. 1 with the cap 14 removed, thus showing the entire elongated stick 12.

An RFID tag was manually inserted into the RFID chamber 28 through opening 32 under ambient conditions. The RFID tag was securely held in RFID chamber 28, and the chip could not be removed from the RFID chamber 28 by shaking the elongated stick 12. The elongated stick 12 was submerged in liquid nitrogen for approximately 2 minutes. The elongated stick 12 was inspected upon removal from the liquid nitrogen. The RFID chamber 28 had several cracks visible to the naked eye.

Example 1

An elongated stick 12 for a cryopreservation device as shown in FIGS. 2a-2d was designed and a prototype was made via 3D printing. Referring to FIGS. 2a, 2b, 2c, and 2d the elongated stick 12 comprised an RFID section 16, an elongated body 20, a frustoconical boss 22 extending from a first end of the elongated body, and a specimen collection tip 24 extending from the narrow end of the frustoconical boss 22. The RFID section 16 comprised a tapered RFID transition zone 26, an RFID chamber 28, and an RFID terminus zone 30. The RFID terminus zone 30 was located along the longitudinal axis further from the elongated body 20 than the RFID transition zone 26, and the RFID chamber 28 was located between the RFID terminus zone 30 and the tapered RFID transition zone 26. The RFID transition zone 26 was tapered because the RFID chamber 28 had a larger cross section than the elongated body 20. The RFID chamber 28 was sized to hold the RFID tag (not shown).

Figure 2A:
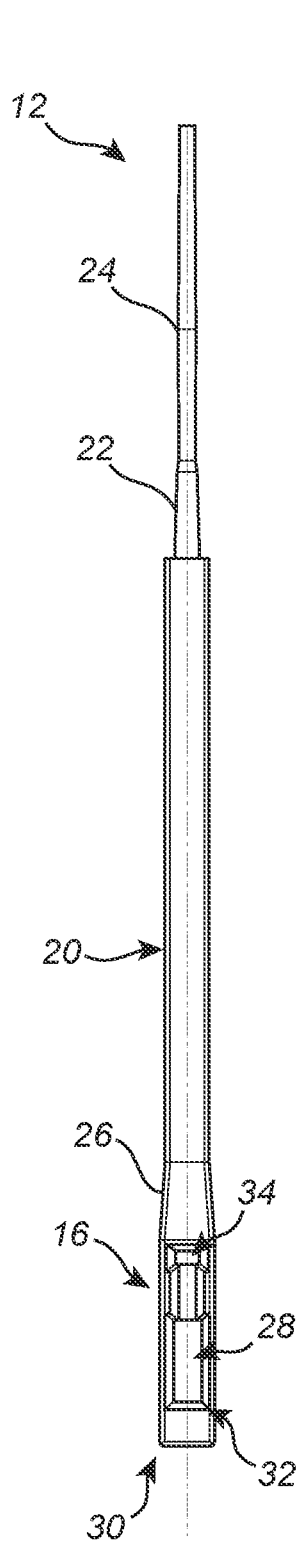
FIG. 2a is a side view of the cryopreservation device of the exemplary embodiment of Example 1.
Figure 2B:
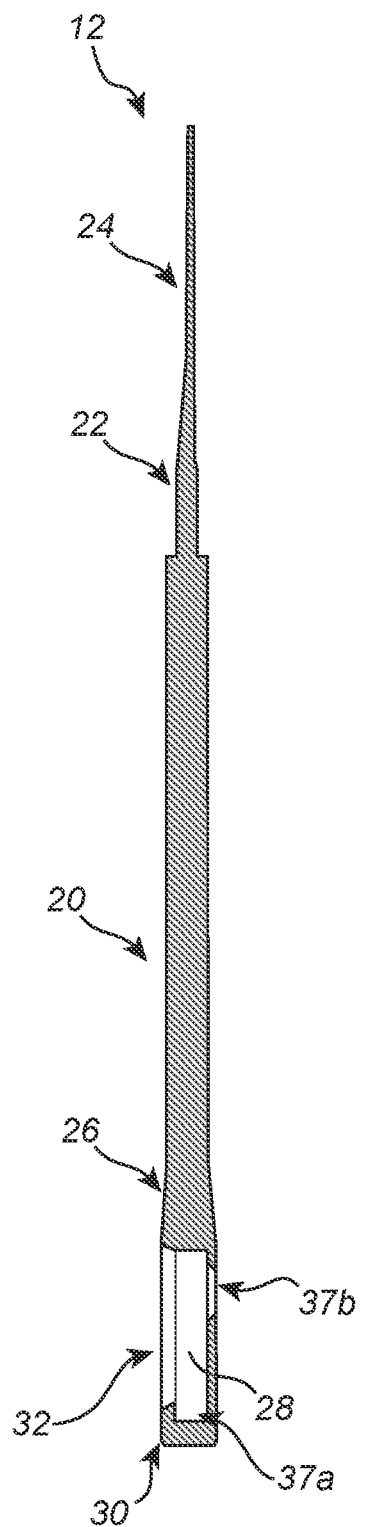
FIG. 2b is a section view of the embodiment shown in FIG. 2a along line A-A.
Figure 2C:
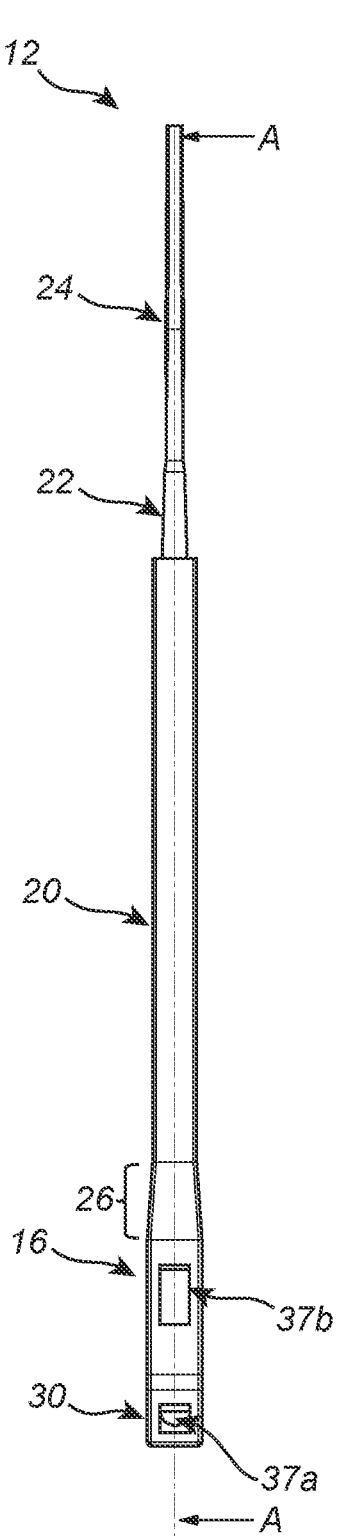
Figure 2D:
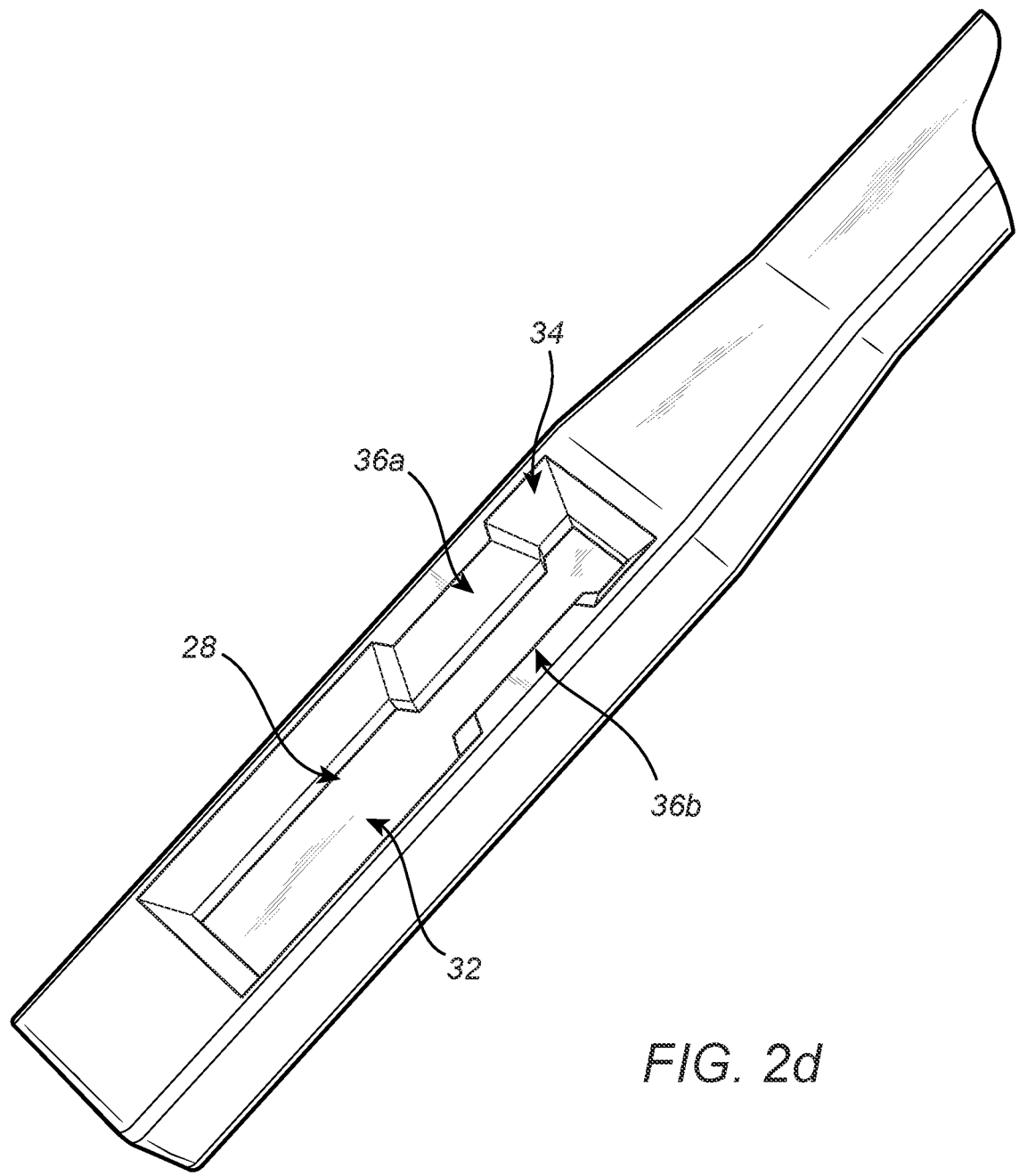

The RFID tag was manually inserted into the RFID chamber 28 through opening 32 which was sized to allow the RFID tag to pass through it and into RFID chamber 28. Locking mechanism 34 defined opening 32. Locking mechanism 34 shown in FIGS. 2a and 2d ensured that the RFID tag (not shown) remained inside the RFID chamber 28 throughout handling and storage of the elongated stick 12. The RFID tag was inserted at an angle allow part of the RFID tag to enter the part of the RFID chamber 28 that was beyond the RFID opening 32 and adjacent to the RFID terminus zone 30. As the RFID tag was then pushed into the RFID chamber 28, flaps 36a and 36b bent downward and rested on top of the RFID tag once it was fully inserted into the RFID chamber 28. As shown in FIG. 2c, openings 37a and 37b were spaced longitudinally along the outer edge of RFID chamber 28 and opening 32 was placed on the opposite side, perpendicularly to the longitudinal direction, of the elongated stick 12. The RFID tag was securely held in RFID chamber 28, and the chip could not be removed from the RFID chamber 28 by shaking the elongated stick 12. The elongated stick 12 was submerged in liquid nitrogen. Upon being inserted into liquid nitrogen for approximately 2 minutes and then being returned to ambient conditions, the RFID section 16 showed no visible signs of cracking. The RFID section 16 was observed at 10× magnification, and still no signs of cracking were observed.

Example 2

Figures 3A, 3B:
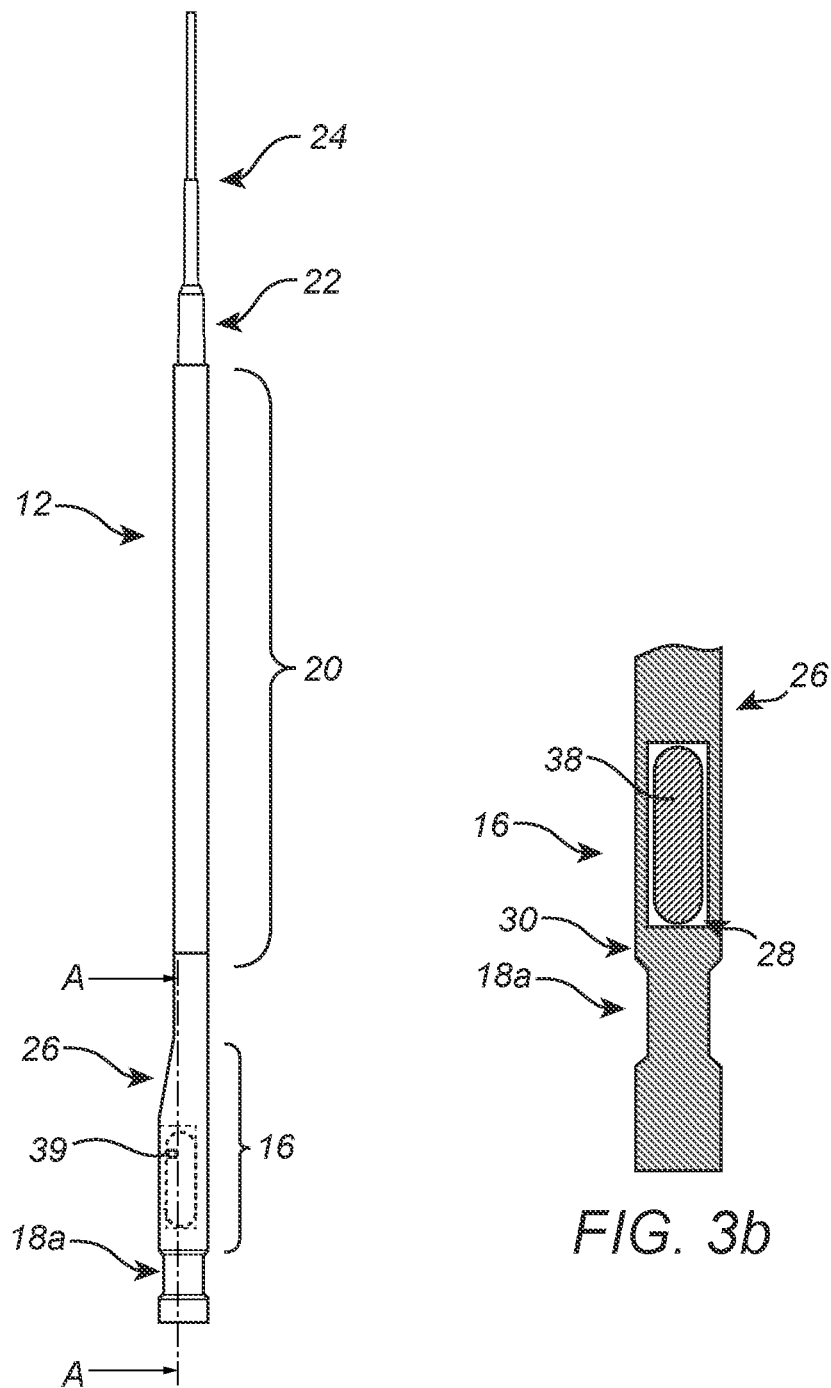
Figure 3C:
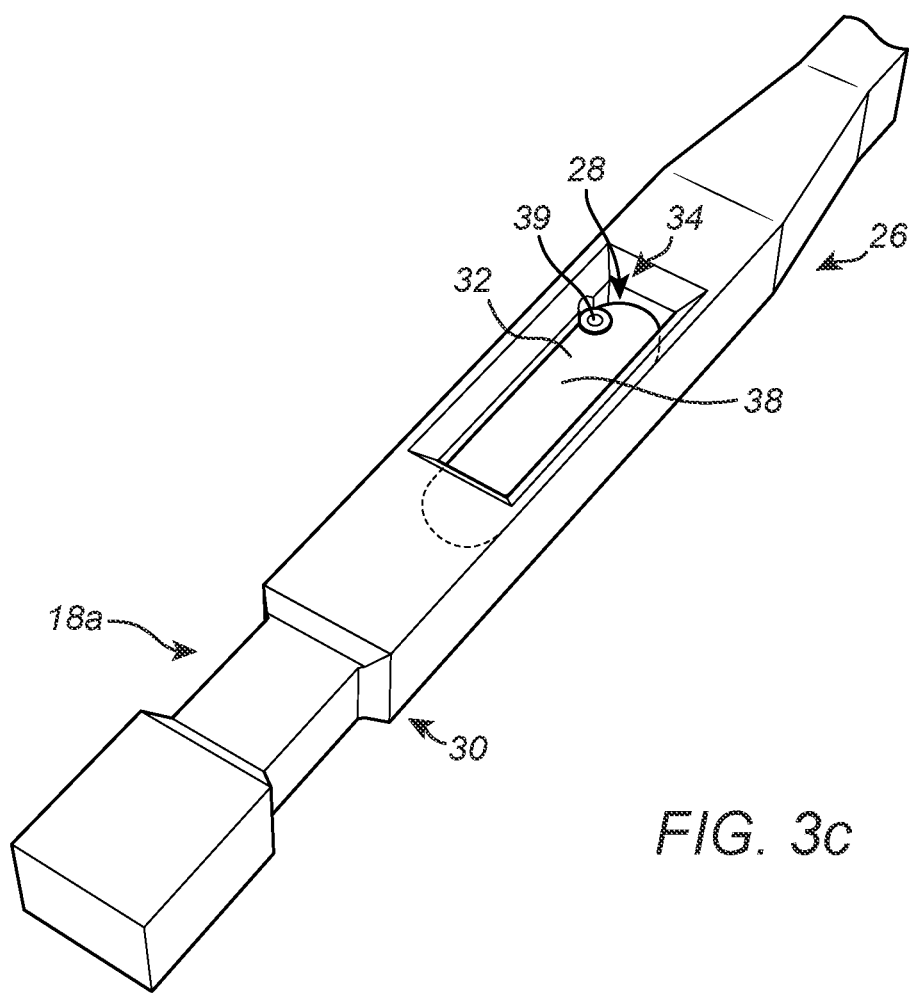

An elongated stick 12 for a cryopreservation device as shown in FIGS. 3a-3c was designed and a prototype was 3D printed. The elongated stick 12 comprised a notch 18a, an RFID section 16, an elongated body 20, a frustoconical boss 22 extending from a first end of the elongated body 20, and a specimen collection tip 24 extended from the narrow end of the frustoconical boss 22. The RFID section 16 comprised a tapered RFID transition zone 26, an RFID chamber 28, and an RFID terminus zone 30. The RFID terminus zone 30 was located along the longitudinal axis further from the elongated body 20 than the RFID transition zone 26, and the RFID chamber 28 was located between the RFID terminus zone 30 and the RFID transition zone 26. The RFID chamber 28 was sized to hold the RFID tag 38. The tapered RFID transition zone 26 was designed to transition from the smaller cross section of the elongated body 20 to the larger cross section of the RFID section 16, while allowing the resting side of elongated body 22 and the RFID section 16 to be straight for ease of handling.

An RFID tag was manually inserted into the RFID chamber 28 through opening 32 under ambient conditions. The RFID tag was inserted at an angle allow part of the RFID tag to enter the part of the RFID chamber 28 that was beyond the RFID opening 32 and adjacent to the RFID terminus zone 30. Locking mechanism 34 included circular tag 39 which bent downward when the RFID tag 38 was loaded into the RFID chamber 28 and was above the RFID tag 38 after it was fully inserted into the RFID chamber 28. Locking mechanism 34 kept the RFID tag 38 within the RFID chamber 28. The RFID tag was securely held in RFID chamber 28, and the RFID tag could not be removed from the RFID chamber 28 by shaking the elongated stick 12. The elongated stick 12 was submerged in liquid nitrogen. Upon being inserted into liquid nitrogen for approximately 2 minutes and then being returned to ambient conditions, the RFID section 16 showed no visible signs of cracking. The RFID section 16 was observed at 10× magnification, and still no signs of cracking were observed.

Comparative Example 2

Figure 4A:
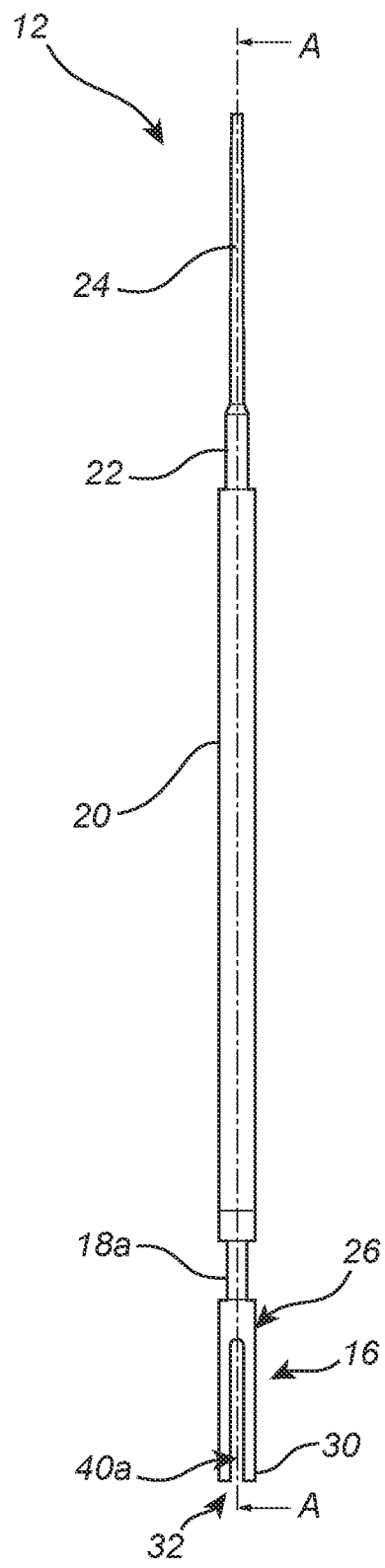
FIG. 4a is a side view of the cryopreservation device of Comparative Example 2.
Figure 4B:
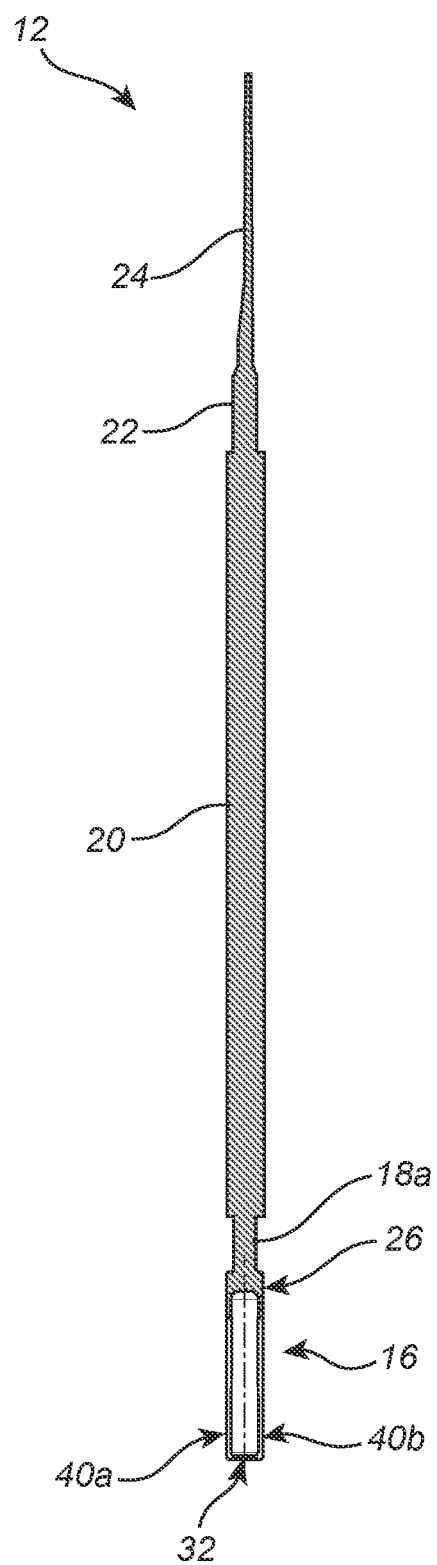
Figure 4C:
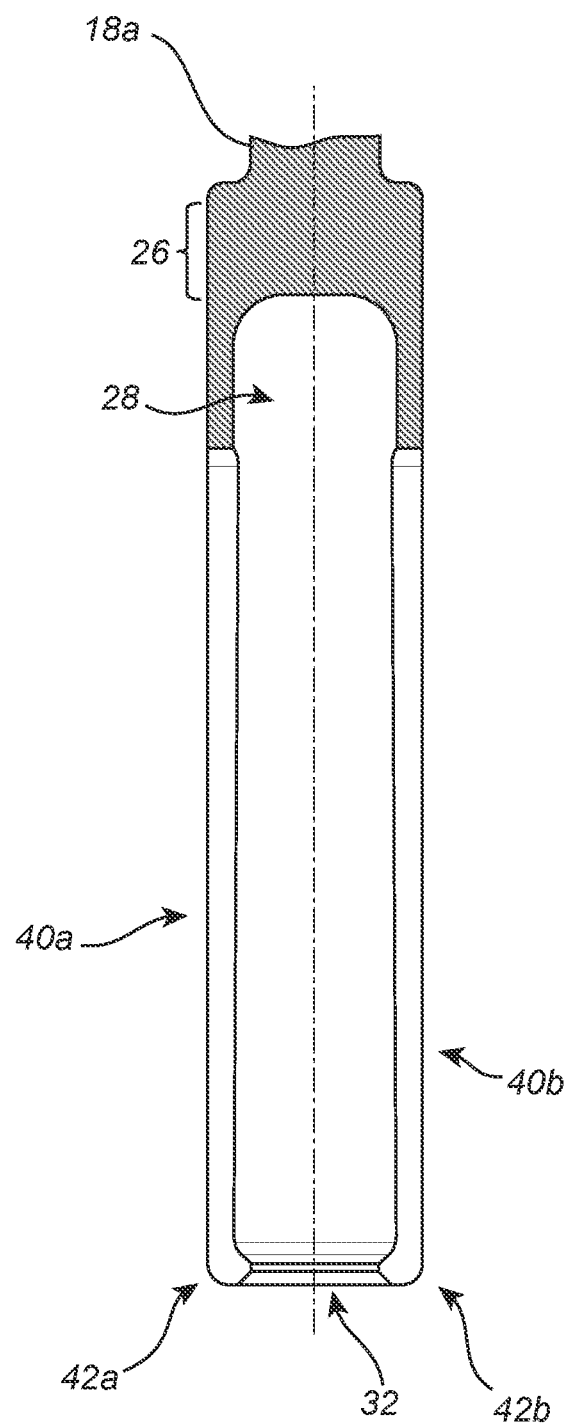

An elongated stick 12 was designed and injection molded. Referring to FIGS. 4a, 4b, and 4c, the elongated stick comprised an RFID section 16, a circumferential notch 18a, an elongated body 20, a frustoconical boss 22 extending from a first end of the elongated body 20, and a specimen collection tip 24 extended from the narrow end of the frustoconical boss 22. The circumferential notch 18a was located between the end of the elongated body 20 distal to the specimen collection tip 24 and the RFID section 16. RFID section 16 comprised an RFID transition zone 26, an RFID chamber 28, and an RFID terminus zone 30. The RFID terminus zone 30 was located along the longitudinal axis further from the elongated body 20 than the RFID transition zone 26, and the RFID chamber 28 was located between the RFID terminus zone 30 and the RFID transition zone 26. The RFID chamber 28 was sized to hold the RFID tag (not shown). As such, RFID chamber 28 was cylindrically shaped and opening 32 was circular. One of two longitudinal slits 40a is shown in FIG. 4a, and both longitudinal slits 40a, 40b are shown in FIGS. 4b and 4c. In this Comparative Example, the longitudinal slits were the same size, and each slit started at RFID opening 32 and removed a piece about 90% the length of the wall of the RFID chamber 28. FIG. 4b is a section view of the elongated stick 12 shown in FIG. 4a, and FIG. 4c is a detailed sectional view of the RFID section 16 of the elongated stick 12 shown in FIG. 4a. The locking mechanism includes the "elbows" or ledge 42a, 42b on at least part of the wall of the RFID chamber 28 nearest to RFID opening 32.

An RFID tag was inserted into the RFID chamber 28 through opening 32 under ambient conditions. The RFID tag could not be removed from the RFID chamber 28 by shaking the elongated stick 12. However, the RFID tag was not securely held in RFID chamber 28, as the RFID tag could be removed from the RFID chamber 28 by simply moving the pieces of the wall of RFID chamber 28 in an outward direction. The elongated stick 12 with the RFID tag in the RFID chamber 28 was submerged in liquid nitrogen. Upon being inserted into liquid nitrogen for approximately 2 minutes and then being returned to ambient conditions, the RFID section 16 showed no visible signs of cracking. The RFID section 16 was observed at 10× magnification, and still no signs of cracking were observed. This design only addressed one of the two necessary criteria, the RFID section 16 did not crack, but the RFID tag was not securely held in place during handling of the cryopreservation device.

Example 3

Figure 5A:
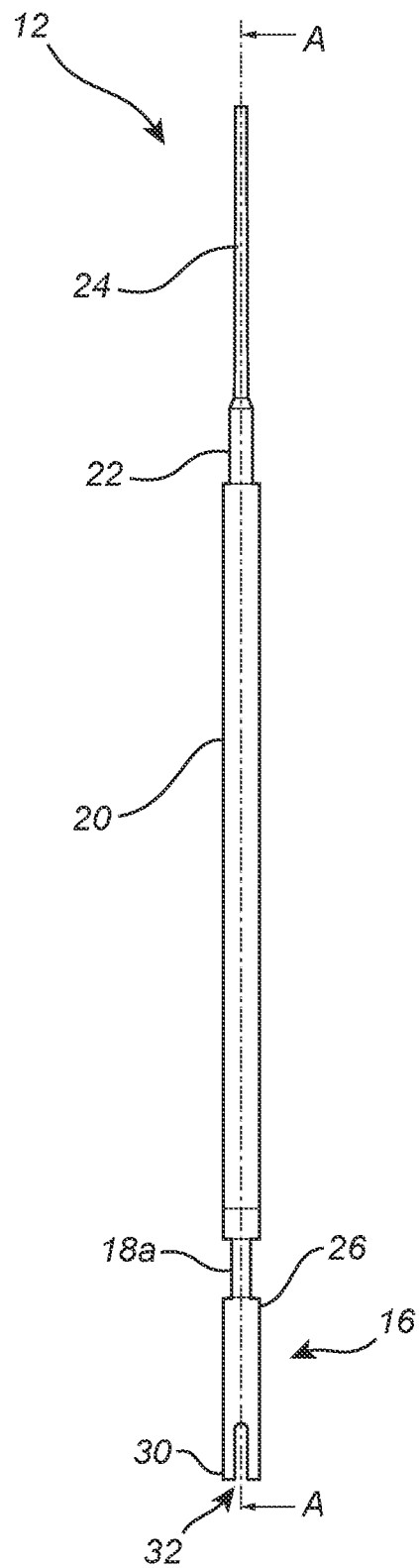
FIG. 5a is a side view of the cryopreservation device of the exemplary embodiment of Example 3.
Figure 5B:
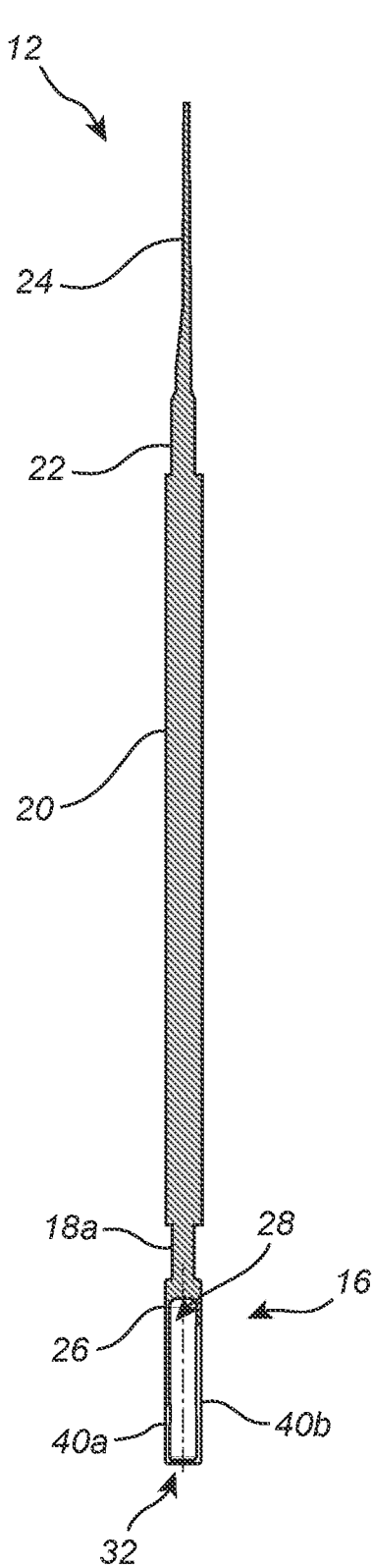
Figure 5C:
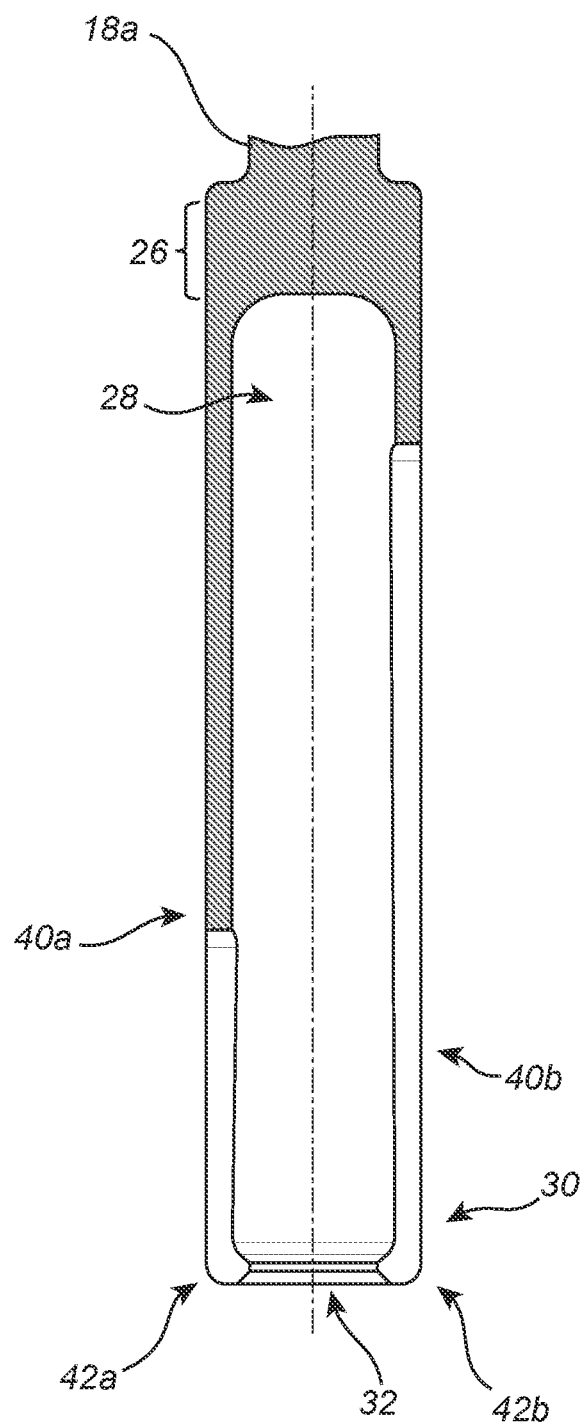

An elongated stick 12 was designed and injection molded. Referring to FIGS. 5a, 5b, and 5c, the elongated stick comprised an RFID section 16, a circumferential notch 18a, an elongated body 20, a frustoconical boss 22 extending from a first end of the elongated body 20, and a specimen collection tip 24 extended from the narrow end of the frustoconical boss 22. The circumferential notch 18a was located between the end of the elongated body 20 distal to the specimen collection tip 24 and the RFID section 16. RFID section 16 comprised an RFID transition zone 26, an RFID chamber 28, and an RFID terminus zone 30. The RFID terminus zone 30 was located along the longitudinal axis further from the elongated body 20 than the RFID transition zone 26, and the RFID chamber 28 was located between the RFID terminus zone 30 and the RFID transition zone 26. The RFID chamber 28 was sized to hold the RFID tag (not shown). As such, RFID chamber 28 was cylindrically shaped and opening 32 was circular. One of two longitudinal slits 40a is shown in FIG. 4a, and both longitudinal slits 40a, 40b are shown in FIGS. 4b, 4c. In this Example, the longitudinal slits are of different sizes, and longitudinal slit 40a removes a piece about 50% the length of the wall of the RFID chamber 28, while longitudinal slit 40b removes a piece about 90% the length of the wall of the RFID chamber 28. FIG. 4b is a section view of the elongated stick 12 shown in FIG. 4a, and FIG. 4c is a detailed sectional view of the RFID section 16 of the elongated stick 12 shown in FIG. 4a. The locking mechanism includes the "elbows" or ledge 42a, 42b on at least part of the wall of RFID chamber 28 nearest to RFID opening 32.

An RFID tag was inserted into the RFID chamber 28 through opening 32 under ambient conditions. The RFID tag was securely held in RFID chamber 28, and the chip could not be removed from the RFID chamber 28 by shaking the elongated stick 12. Unlike in Comparative Example 2, the RFID tag could not be removed from the RFID Chamber 28 by moving the walls of the RFID chamber 28 outward. The elongated stick 12 was submerged in liquid nitrogen. Upon being inserted into liquid nitrogen for approximately 2 minutes and then being returned to ambient conditions, the RFID section 16 showed no visible signs of cracking. The RFID section 16 was observed at 10× magnification, and still no signs of cracking were observed.

Figures 6A, 6B, 6C:
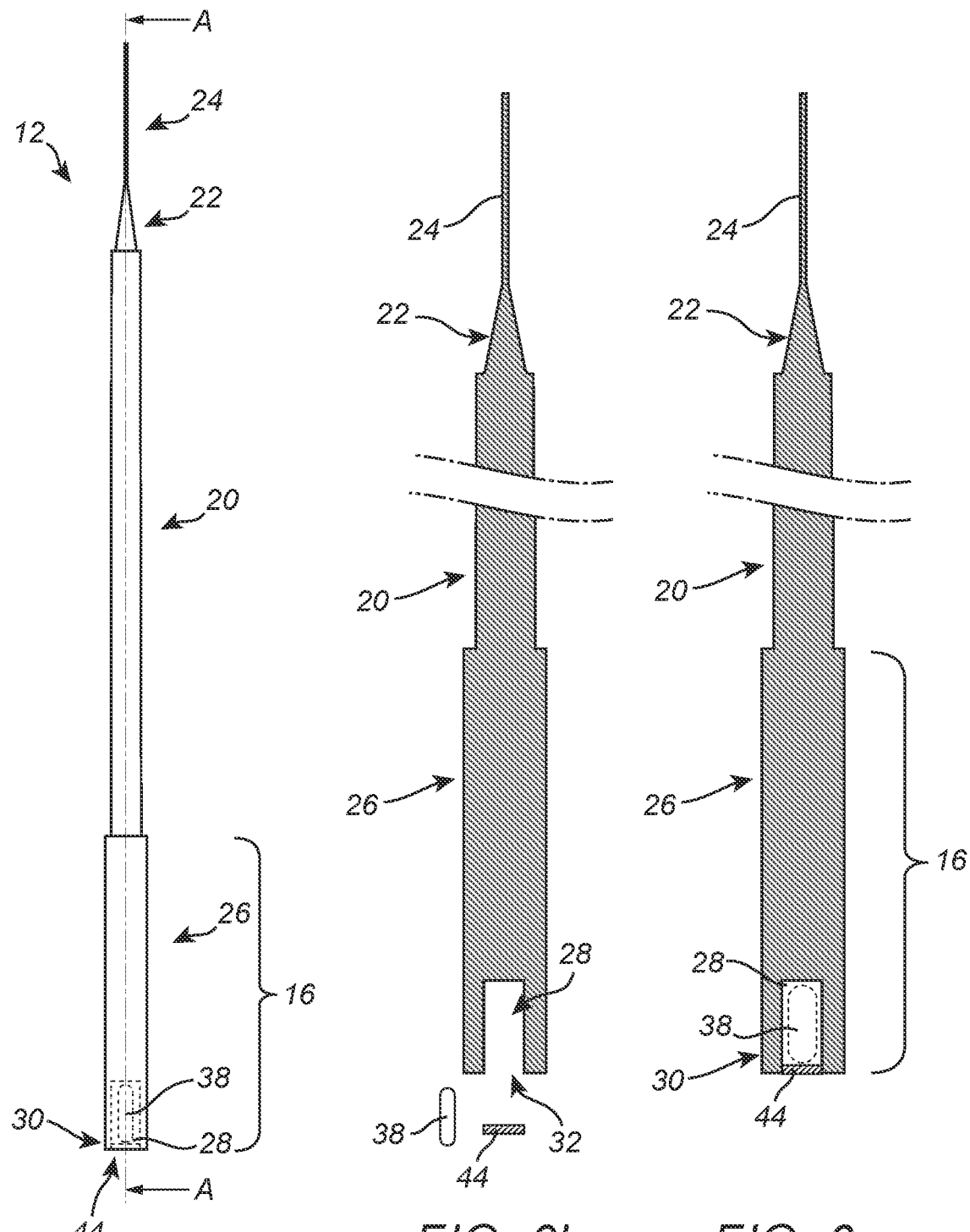
FIG. 6a is a side view of another embodiment of the cryopreservation device with an end-loading RFID section and a plug for the locking mechanism.
FIG. 6b is a section view of the RFID section of the embodiment shown in FIG. 6a, the not-yet-loaded RFID tag and the plug detached form the RFID section.
FIG. 6c is a section view of the RFID section of the embodiment shown in FIG. 6a with an RFID tag securely contained within the RFID chamber.

FIG. 6a illustrates another embodiment of the closed system cryopreservation device 10 with an elongated stick 12 and a cap 14 (not shown) with an end-loading RFID section 16. The elongated stick 12 comprises an RFID section 16, an elongated body 20, a frustoconical boss 22 extending from a first end of the elongated body 20, and a specimen collection tip 24 extended from the narrow end of the frustoconical boss 22. The RFID section 16 comprises an RFID transition zone 26, an RFID compartment 28, and an RFID terminus zone 30. RFID plug 44 is removably attachable to the RFID section 16. The RFID terminus zone 30 is located along the longitudinal axis further from the elongated body 20 than the RFID transition zone 26, and the RFID chamber 28 is located between the RFID terminus zone 30 and the RFID transition zone 26.

FIGS. 6b and 6c, are detailed sectional views of the RFID section 16 of the embodiment shown in FIG. 6a. FIG. 6b is a sectional view illustrating an empty RFID chamber 28 with the RFID tag 38 and RFID plug 44 separate from the RFID section 16. FIG. 6c is a sectional view illustrating RFID tag 38 within the RFID chamber 28 and secured by RFID plug 44. In this embodiment, the RFID chamber 28 is slightly oversized relative to the RFID tag 38 to allow for thermal contraction when the cryopreservation device is submerged in liquid nitrogen. RFID plug 44 serves the same purpose as locking mechanisms 34 shown in the embodiments of FIGS. 2a-2d and 3a-3c. By blocking RFID opening 32, RFID plug 44 keeps the RFID tag 38 in RFID chamber 28 throughout handling and storage of the cryopreservation device.

Figure 7:
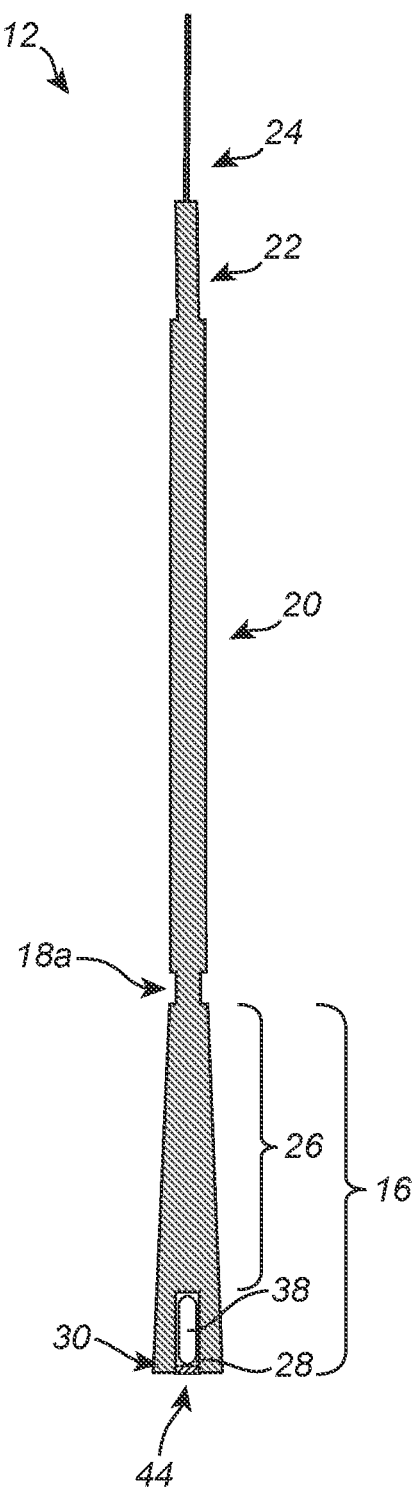
FIG. 7 is a section view of another embodiment of the cryopreservation device with an end-loading RFID section.

FIG. 7 illustrates another embodiment of the cryopreservation device 10 with an elongated stick 12 and a cap 14 (not shown) with an alternative end-loading RFID section 16. The elongated stick 12 comprises an RFID section 16, a circumferential notch 18a, an elongated body 20, frustoconical boss 22 extending from a first end of the elongated body 20, and a specimen collection tip 24 extended from the narrow end of the boss 22. The circumferential notch 18a is located between the end of the elongated body 20 distal to the specimen collection tip 24 and the RFID section 16. The RFID section 16 comprises an RFID transition zone 26, an RFID chamber 28, and an RFID terminus zone 30 containing an RFID plug 44. The RFID terminus zone 30 is located along the longitudinal axis further from the elongated body 20 than the RFID transition zone 26, and the RFID chamber 28 is located between the RFID terminus zone 30 and the RFID transition zone 26. In FIG. 7, the entirety of the RFID section 16 is tapered, giving it a larger cross section the further removed from the elongated body 20.

Figure 8A:
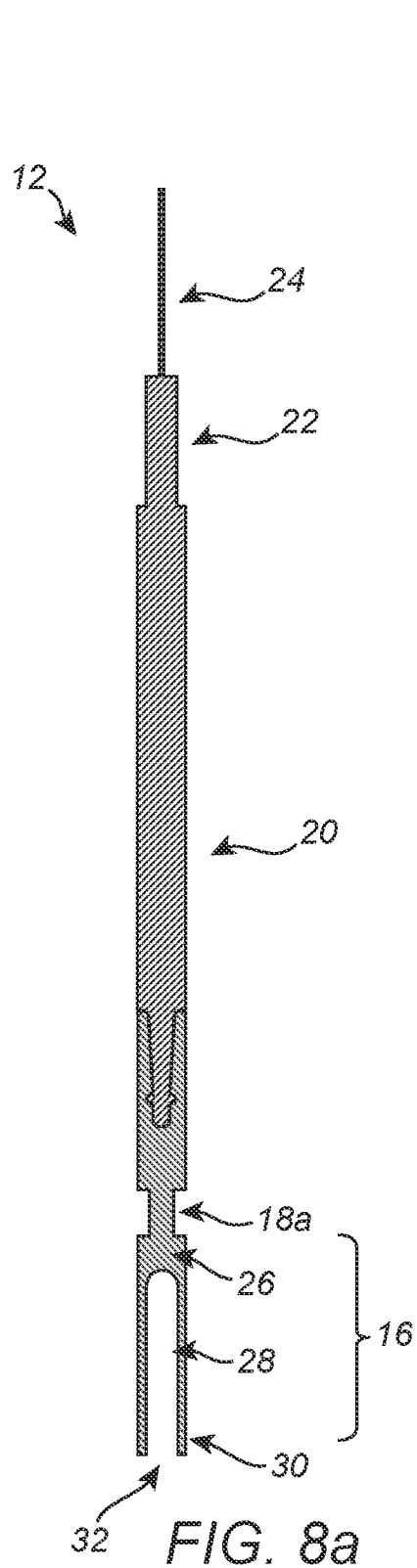
FIG. 8a is a section view of another embodiment of the cryopreservation device with a detachable RFID section.
Figure 8B:
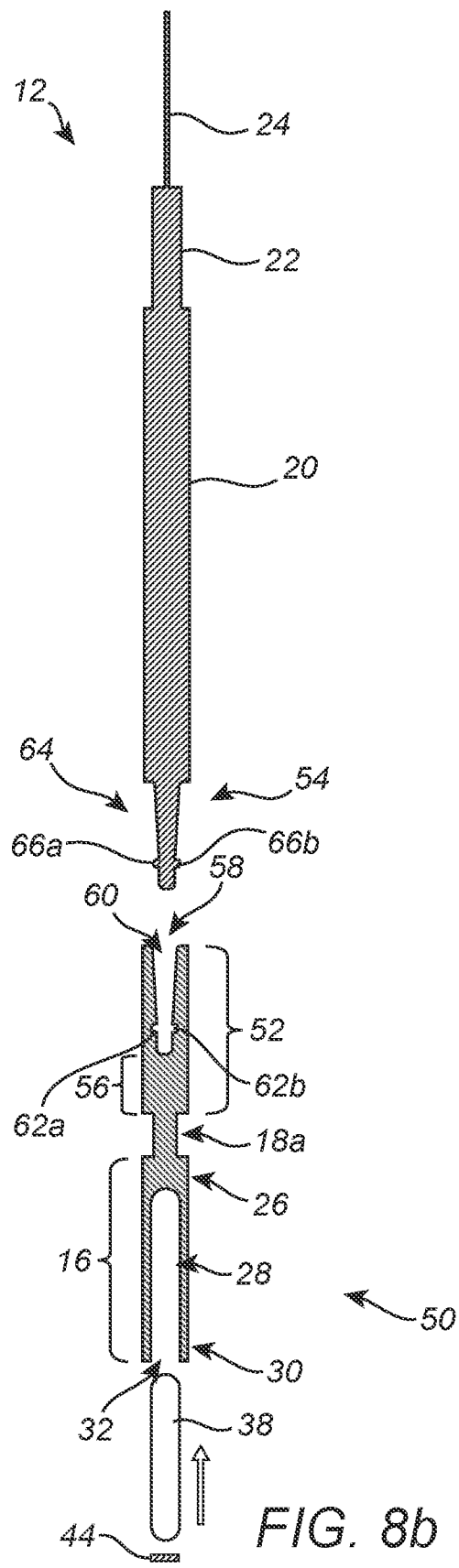
FIG. 8b is a section view of the detachable RFID section an elongated body of the embodiment shown in FIG. 8a in a detached state.

FIGS. 8a and 8b illustrate another embodiment of the cryopreservation device 10 with an elongated stick 12 and a cap 14 (not shown). The elongated stick 12 comprises a removably attachable component 50, an elongated body 20, frustoconical boss 22 extending from a first end of the elongated body, and a specimen collection tip 24 extended from the narrow end of the frustoconical boss 22. The removably attachable component 50 comprises RFID section 16, notch 18a, and RFID connection element 52. The elongated body 20 comprises a compatible body connection element 54. RFID connection element 52 comprises transition zone 56 and RFID locking mechanism 58. Transition zone 56 is distal to elongated body 20 and RFID locking mechanism 58 is between transition zone 56 and elongated body 20 when removably attachable component 50 is attached to the elongated body 20. RFID locking mechanism 58 comprises a hollow chamber 60 with notches 62a and 62b toward the end of hollow chamber 60 nearest transition zone 56. The compatible body connection element 54 is located on elongated body 20 distal from the specimen collection tip 24 and comprises solid object 64 and extensions 66a and 66b. Extensions 66a and 66b are located toward the end of compatible body connection element 54 distal to elongated body 20. Solid object 64 is sized to fit in chamber 60 and extensions 66a and 66b are sized to fit into notches 62a and 62b, when removably attachable component 50 is attached to the elongated body 20.

Figure 8C:
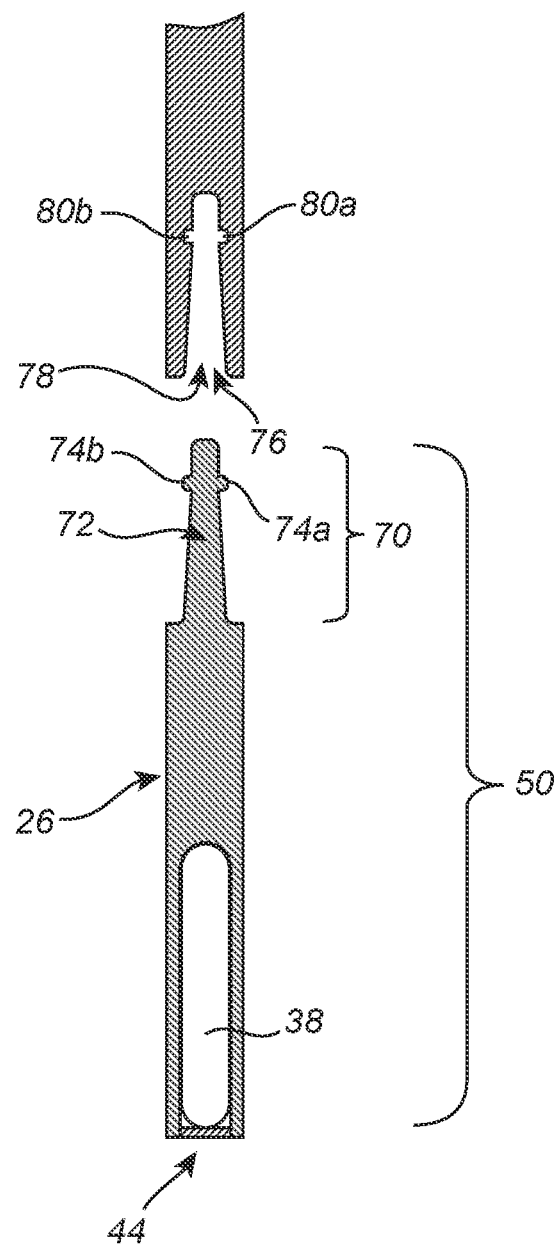
FIG. 8c is a section view of an alternative connection configuration of a cryopreservation device and a corresponding detachable RFID section.

FIG. 8c illustrates an alternative locking mechanism for the RFID connection element 52 of the removably attachable component 50 and the compatible body connection element 54 shown in FIG. 8b. The removably attachable RFID connection element 50 comprises RFID section 16 and RFID connection element 70. RFID connection element 70 comprises solid object 72 with extensions 74a and 74b. RFID transition zone 26 is distal to elongated body 20 and solid object 72 is between RFID transition zone 26 and the elongated body 20 when removably attachable component 50 is attached to the elongated body 20. Extensions 74a and 74b are located toward the end of solid object 72 distal from RFID transition zone 26. The compatible body locking mechanism 76 comprises a hollow chamber 78 with notches 80a and 80b. Compatible body locking mechanism 76 is sized to receive solid object 72 and notches 80a and 80b are sized to receive extensions 74a and 74b, when removably attachable component 50 is attached to the elongated body 20.

Figure 9A:
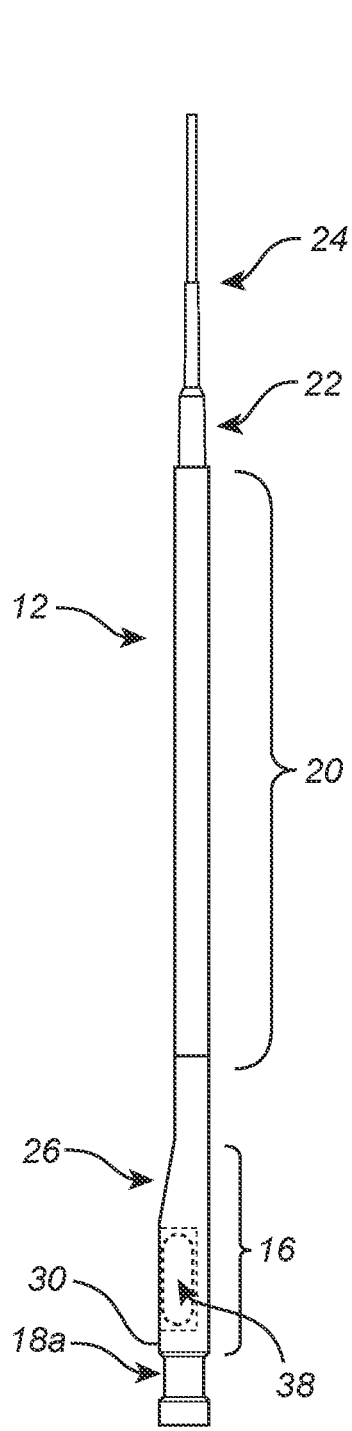
FIG. 9a is a side view of another embodiment of the cryopreservation device with a top-loading RFID section.

FIG. 9a illustrates another embodiment of the cryopreservation device 10 with an elongated stick 12 and a cap 14 (not shown) with another embodiment of top-loading RFID section 16. The elongated stick 12 comprises a notch 18a, an RFID section 16, an elongated body 20, a frustoconical boss 22 extending from a first end of the elongated body 20, and a specimen collection tip 24 extended from the narrow end of the frustoconical boss 22. The RFID section 16 comprises an RFID transition zone 26, an RFID chamber 28, and an RFID terminus zone 30.

Figure 9B:
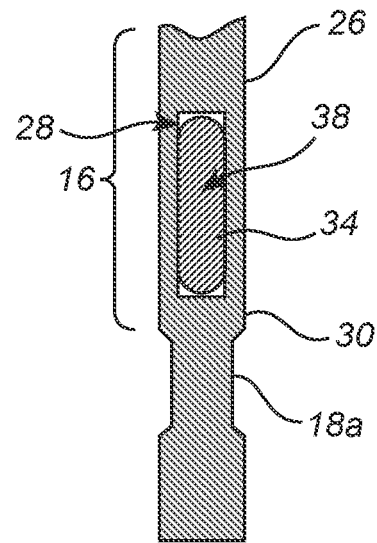
Figure 9C:
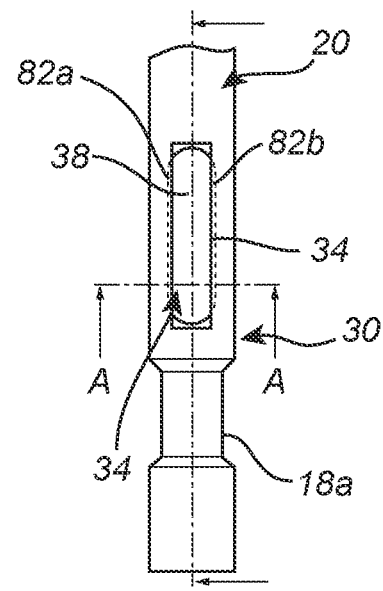
Figure 9D:
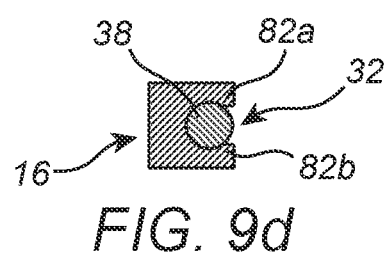
FIG. 9d is different section view of the RFID section of the embodiment shown in FIG. 9c.

FIGS. 9b, 9c, and 9d are detailed views of the RFID section 16 of the embodiment shown in FIG. 9a. FIG. 9b is a section view illustrating an RFID tag 38 in the RFID chamber 28. The edges of RFID tag 38 are not seen because the locking mechanism 34 runs the length of the RFID chamber 28, and the locking mechanism sits on top of the sides of the RFID tag 38 once it is loaded into the RFID chamber 28. FIG. 9c is a top view illustrating the locking mechanism 34 which defines opening 32 at the top of the RFID chamber 28. Locking mechanism parts 82a and 82b extend over the RFID tag 38 when the RFID tag 38 is fully inserted into the RFID chamber 28. Locking mechanism parts 82a and 82b are capable of keeping the RFID tag 38 within the RFID chamber 28.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A cryopreservation device, the cryopreservation device comprising:
   a) an elongated stick comprising an RFID section, an elongated body, and a specimen collection tip, and
   b) a cap comprising a hollow chamber, wherein the hollow chamber has a length sufficient to accommodate the specimen collection tip;

wherein the cap is capable of enclosing the specimen collection tip within the hollow chamber when the cap is removably attached to the elongated stick;

wherein the RFID section is distal to the specimen collection tip and the RFID section comprises:
a) an RFID chamber capable of holding an RFID tag,
b) an RFID opening through which the RFID tag can be placed into the RFID chamber, and
c) a locking mechanism abutting a circumference of the RFID opening;

wherein a length of the RFID opening is along a longitudinal axis of the elongated stick and, wherein the locking mechanism comprises a circumferential flap bending inward towards the RFID chamber.

2. The cryopreservation device of claim 1, further comprising a frustoconical boss extending from a first end of the elongated body, wherein the specimen collection tip extends from the frustoconical boss, and wherein the cap is capable of enclosing the specimen collection tip and the frustoconical boss within the hollow chamber when the cap is removably attached to the elongated stick.

3. The cryopreservation device of claim 1, wherein the locking mechanism further comprises an obtrusion connected to the circumferential flap.

4. The cryopreservation device of claim 1, wherein the length of the RFID opening is shorter than a RFID-chamber length.

5. The cryopreservation device of claim 1, wherein the RFID chamber has at least one dimension perpendicular to the longitudinal direction that is between 1.01% to 1.1% a same dimension of the RFID tag.

6. The cryopreservation device claim 1, wherein the elongated stick is made of one integrated piece of plastic.

7. The cryopreservation device of claim 1, wherein, when the RFID tag is placed in the RFID chamber and the cryopreservation device is placed in liquid nitrogen for 5 minutes, the RFID tag remains in the RFID chamber and the cryopreservation device shows no visible cracks.

8. The cryopreservation device of claim 1, wherein the RFID tag is cylindrical and has a length ranging from 4 mm to 12 mm long and a diameter ranging from 0.5 mm to 4 mm.

9. The cryopreservation device of claim 1, wherein the RFID section dimension in each of the x and y directions, perpendicular to the longitudinal direction, is no larger than about 3 mm.

10. The cryopreservation device of claim 1, wherein the RFID section dimension in each of the x and y directions, perpendicular to the longitudinal direction, is no larger than about 2.4 mm.

11. A cryopreservation device, the cryopreservation device comprising:
a) an elongated stick comprising an RFID section, an elongated body, and a specimen collection tip, and
b) a cap comprising a hollow chamber, wherein the hollow chamber has a length sufficient to accommodate the specimen collection tip;
wherein the cap is capable of enclosing the specimen collection tip within the hollow chamber when the cap is removably attached to the elongated stick;
wherein the RFID section is distal to the specimen collection tip and the RFID section comprises:
a) an RFID chamber capable of holding the RFID tag,
b) an RFID opening through which the RFID tag can be placed into the RFID chamber, and
c) a locking mechanism abutting a circumference of the RFID opening;
wherein a length of the RFID opening is along a longitudinal axis of the elongated stick;
wherein the locking mechanism comprises a circumferential flap bending inward towards the RFID chamber;
wherein the length of the RFID opening is shorter than a RFID-chamber length; and
wherein the RFID chamber has at least one dimension perpendicular to the longitudinal direction that is between 1.01% to 1.1% a same dimension of the RFID tag.

12. The cryopreservation device of claim 11, further comprising a frustoconical boss extending from a first end of the elongated body, wherein the specimen collection tip extends from the frustoconical boss, and wherein the cap is capable of enclosing the specimen collection tip and the frustoconical boss within the hollow chamber when the cap is removably attached to the elongated stick.

13. The cryopreservation device of claim 11, wherein the locking mechanism further comprises an obtrusion connected to the circumferential flap.

14. The cryopreservation device claim 11, wherein the elongated stick is made of one integrated piece of plastic.

15. The cryopreservation device of claim 11, wherein, when the RFID tag is placed in the RFID chamber and cryopreservation device is placed in liquid nitrogen for 5 minutes, the RFID tag remains in the RFID chamber and the cryopreservation device shows no visible cracks.

16. The cryopreservation device of claim 11, wherein the RFID tag is cylindrical and has a length ranging from 4 mm to 12 mm long and a diameter ranging from 0.5 mm to 4 mm.

17. The cryopreservation device of claim 11, wherein the RFID section dimension in each of the x and y directions, perpendicular to the longitudinal direction, is no larger than about 3 mm.

18. The cryopreservation device of claim 11, wherein the RFID section dimension in each of the x and y directions, perpendicular to the longitudinal direction, is no larger than about 2.4 mm.

19. A cryopreservation device, the cryopreservation device comprising:
a) an elongated stick comprising an RFID section, an elongated body, a frustoconical boss extending from a first end of the elongated body, and a specimen collection tip extending from the frustoconical boss, and
b) a cap comprising a hollow chamber, wherein the hollow chamber has a length sufficient to accommodate the specimen collection tip and the frustoconical boss,
wherein the cap is capable of enclosing the specimen collection tip and the frustoconical boss within the hollow chamber when the cap is removably attached to the elongated stick;
wherein the RFID section is distal to the specimen collection tip and the RFID section comprises:
a) an RFID chamber capable of holding the RFID tag,
b) an RFID opening through which the RFID tag can be placed into the RFID chamber, and
c) a locking mechanism abutting a circumference of the RFID opening;
wherein the elongated stick is made of one integrated piece of plastic;
wherein a length of the RFID opening is along a longitudinal axis of the elongated stick, wherein the RFID-opening length is shorter than a RFID-chamber length, wherein the locking mechanism comprises a circumferential flap bending inward toward the RFID chamber, wherein the locking mechanism further comprises an obtrusion connected to the circumferential flap and protruding over RFID opening, and wherein the RFID chamber has at least one dimension perpendicular to the longitudinal direction that is between 1.01% to 1.1% the same dimension of the RFID tag.

* * * * *